United States Patent
Kaneko

(10) Patent No.: US 11,036,443 B2
(45) Date of Patent: Jun. 15, 2021

(54) IMAGE FORMING APPARATUS HAVING TEST PRINTING FUNCTION, CONTROL METHOD FOR THE IMAGE FORMING APPARATUS, STORAGE MEDIUM, AND IMAGE FORMING SYSTEM

(71) Applicant: CANON KABUSHIKI KAISHA, Tokyo (JP)

(72) Inventor: Takayuki Kaneko, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/854,013

(22) Filed: Apr. 21, 2020

(65) Prior Publication Data

US 2020/0249880 A1    Aug. 6, 2020

Related U.S. Application Data

(63) Continuation of application No. 16/045,114, filed on Jul. 25, 2018, now Pat. No. 10,664,203, which is a
(Continued)

(30) Foreign Application Priority Data

Jul. 29, 2014   (JP) .............................. JP2014-153769

(51) Int. Cl.
*G06F 3/12* (2006.01)
*G06K 15/00* (2006.01)
(Continued)

(52) U.S. Cl.
CPC ........... *G06F 3/1204* (2013.01); *G03G 15/55* (2013.01); *G06F 3/1256* (2013.01);
(Continued)

(58) Field of Classification Search
CPC ............................. G06F 3/1204; G06F 3/1256
See application file for complete search history.

(56) References Cited

U.S. PATENT DOCUMENTS

| 6,373,588 B1 | 4/2002 | Fischer |
| 6,757,500 B2 | 6/2004 | Kuboki |

(Continued)

FOREIGN PATENT DOCUMENTS

| CN | 102457645 A | 5/2012 |
| JP | 2001341361 A | 12/2001 |

(Continued)

OTHER PUBLICATIONS

Office Action issued in Chinese Application No. 201510446014.0 dated Oct. 16, 2017. English translation provided.
(Continued)

*Primary Examiner* — Juan M Guillermety
(74) *Attorney, Agent, or Firm* — Rossi, Kimms & McDowell LLP

(57) ABSTRACT

An image forming apparatus which prevents a user from being confused when print data comprised of a plurality of sections is printed by the image forming apparatus. The image forming apparatus is able to perform test printing of print data for which a plurality of copies are to be printed. Whether or not a plurality of sections are included in selected print data is determined, and when it is determined that a plurality of sections are included in the selected print data, execution of the test printing is restricted.

5 Claims, 20 Drawing Sheets

Related U.S. Application Data continuation of application No. 14/808,169, filed on Jul. 24, 2015, now Pat. No. 10,095,446.

(51) Int. Cl.
  *G03G 15/00* (2006.01)
  *G06K 15/02* (2006.01)

(52) U.S. Cl.
  CPC ......... *G06F 3/1285* (2013.01); *G06K 15/005* (2013.01); *G03G 15/502* (2013.01); *G03G 2215/00569* (2013.01); *G06F 3/1258* (2013.01); *G06K 15/002* (2013.01); *G06K 15/027* (2013.01); *G06K 15/1817* (2013.01)

(56) References Cited

U.S. PATENT DOCUMENTS

| | | |
|---|---|---|
| 7,315,387 B2 | 1/2008 | Nishikawa |
| 8,139,241 B2 | 3/2012 | Okada |
| 8,773,697 B2 | 7/2014 | Anno |
| 2004/0125398 A1 | 7/2004 | Aiyama |
| 2007/0052980 A1 | 3/2007 | Lee |
| 2007/0274735 A1 | 11/2007 | Tsukamoto |
| 2008/0037048 A1 | 2/2008 | Hopper |
| 2008/0168450 A1 | 7/2008 | Tarumi |
| 2009/0262390 A1 | 10/2009 | Tanaka |
| 2010/0020346 A1 | 1/2010 | Morales |
| 2012/0105881 A1 | 5/2012 | Fukaya |
| 2012/0194860 A1 | 8/2012 | Anno |
| 2013/0215464 A1 | 8/2013 | Kubo |
| 2014/0218760 A1 | 8/2014 | Murata |
| 2014/0340702 A1 | 11/2014 | Maki |

FOREIGN PATENT DOCUMENTS

| | | |
|---|---|---|
| JP | 2002127570 A | 5/2002 |
| JP | 2003016056 A | 1/2003 |
| JP | 2006042303 A | 2/2006 |
| JP | 2006123415 A | 5/2006 |
| JP | 3907362 B2 | 4/2007 |
| JP | 2008059034 A | 3/2008 |
| JP | 2008165708 A | 7/2008 |
| JP | 2008198042 A | 8/2008 |
| JP | 2008245322 A | 10/2008 |
| JP | 2009154544 A | 7/2009 |
| JP | 2010147796 A | 7/2010 |
| JP | 2012153058 A | 8/2012 |

OTHER PUBLICATIONS

Office Action issued in U.S. Appl. No. 14/808,169 dated Jun. 30, 2016.
Office Action issued in U.S. Appl. No. 14/808,169 dated Jan. 31, 2017.
Office Action issued in U.S. Appl. No. 14/808,169 dated Oct. 4, 2017.
Office Action issued in Korean Appln. No. 10-2015-0106306 dated Jan. 25, 2018.
Office Action issued in Japanese Appln. No. 2014-153769 dated May 22, 2018. English translation provided.
Notice of Allowance issued in U.S. Appl. No. 14/808,169 dated Apr. 27, 2018.
Notice of Allowance issued in Korean Appln. No. 10-2015-0106306 dated Jul. 30, 2018. English translation provided.
Office Action issued in U.S. Appl. No. 16/045,114 dated Sep. 4, 2018.
Notice of Allowance issued in U.S. Appl. No. 16/045,114 dated Feb. 13, 2019.
Office Action issued in U.S. Appl. No. 16/045,114 dated Sep. 13, 2019.
Notice of Allowance issued in U.S. Appl. No. 16/045,114 dated Feb. 13, 2020.

FIG. 8

| DATE AND TIME | USER NAME | STORAGE LOCATION | PRINT JOB NAME | PRINT SETTING |
|---|---|---|---|---|
| 2012/4/10 10:34:45 | Kaneko | /data/0015/xxx | AAA.txt | ONE-SIDED 1 COPY MONOCHROME |
| 2012/4/20 13:50:22 | Nakajima | /data/0591/yyy | BBB.pdf | DOUBLE-SIDED 3 COPIES COLOR |
| 2012/5/28 14:10:00 | Kaneko | /data/8125/zzz | CCC.doc | DOUBLE-SIDED 5 COPIES 2-IN-1 COLOR |

801  802  803  804  805  806  800

Method for the image forming apparatus, storage medium, and image forming system

IMAGE FORMING APPARATUS HAVING TEST PRINTING FUNCTION, CONTROL METHOD FOR THE IMAGE FORMING APPARATUS, STORAGE MEDIUM, AND IMAGE FORMING SYSTEM

BACKGROUND OF THE INVENTION

Field of the Invention

The present invention relates to an image forming apparatus, a control method for the image forming apparatus, a storage medium, and an image forming system.

Description of the Related Art

When print data comprised of a plurality of sections is to be printed on recording sheets, a user may set different numbers of print copies for respective ones of the plurality sections constituting the print data. In this case, an image forming apparatus prints the sections of the print data on recording sheets based on the numbers of print copies set by the user.

There are known image forming apparatuses which have a test printing function of, when printing multiple copies of print data comprised of one section, printing only one copy of print data on recording sheets first (see, for example, Japanese Laid-Open Patent Publication (Kokai) No. 2001-341361). When a user has obtained a desired printing result by test printing, the image forming apparatus described in Japanese Laid-Open Patent Publication (Kokai) No. 2001-341361 prints the same number of copies of print data as a number obtained by subtracting one from the number of print copies originally intended.

However, when a user orders test printing for print data which is comprised of a plurality of sections and for which different numbers of print copies are set for the respective sections, the user may be confused.

Assume, for example, that the number of print copies for the first section is set to 1, and the number of print copies for the second section is set to 10. Conventionally, for print data comprised of one section, an instruction to perform test printing is not accepted because it is useless to perform test printing when the number of print copies is set to 1.

For print data comprised of a plurality of sections mentioned above, the number of print copies set for the second section is plural, and hence it is useful to perform test printing for the second section, but it is useless to perform test printing for the first sections. If test printing is performed only for the second section, a user may be perplexed by test printing being not performed for the first section.

Further, when results of test printing can be seen only after both printed matter of the first section and printed matter of the second section are available, it is useless to perform test printing only for the second section. Moreover, if test printing is performed for the first section, the first section is not printed at the time of normal printing after test printing, and hence a user may be perplexed by this after all.

SUMMARY OF THE INVENTION

The present invention provides an image forming apparatus and a control method therefor, which are capable of preventing a user from being confused when print data comprised of a plurality of sections is printed by the image forming apparatus having a test printing function, a storage medium, and an image forming system.

Accordingly, the present invention provides an image forming apparatus which is capable of performing test printing of print data for which a plurality of copies are to be printed, comprising a determination unit configured to determine whether a plurality of sections are included in selected print data, and a restriction unit configured to, when said determination unit determines that a plurality of sections are included in selected print data, restrict execution of the test printing.

According to the present invention, whether or not a plurality of sections is included in print data is determined, and when a plurality of sections is included in the print data, execution of test printing is restricted. This prevents a user from being confused when print data comprised of a plurality of sections is printed using the image forming apparatus having the test printing function.

Further features of the present invention will become apparent from the following description of exemplary embodiments (with reference to the attached drawings).

BRIEF DESCRIPTION OF THE DRAWINGS

FIG. 8 is a view useful in explaining a bibliographical information list stored in an HDD in step S706 in FIG. 7.

DESCRIPTION OF THE EMBODIMENTS

The present invention will now be described in detail with reference to the drawings showing an embodiment thereof.

Figure 1:
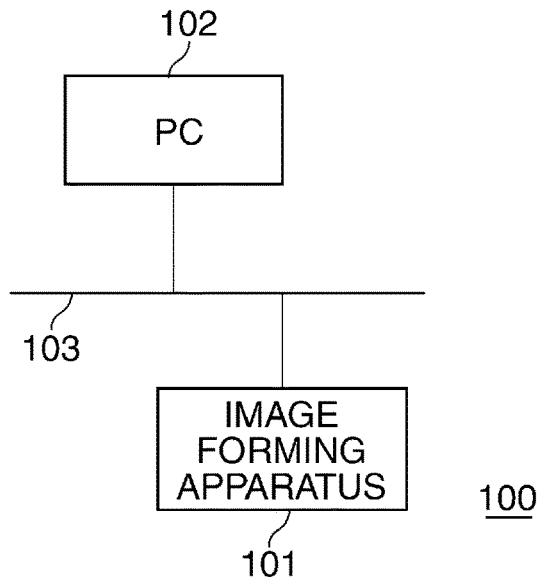
FIG. 1 is a block diagram schematically showing an arrangement of an image forming system including an image forming apparatus according to an embodiment of the present invention.

FIG. 1 is a block diagram schematically showing an arrangement of an image forming system 100 including an image forming apparatus 101 according to an embodiment of the present invention.

The image forming system 100 has the image forming apparatus 101 and a PC 102, and the image forming apparatus 101 and the PC 102 are connected together via a LAN 103. Print data is sent from the PC 102 to the image forming apparatus 101, which in turn prints the print data.

Figure 2:
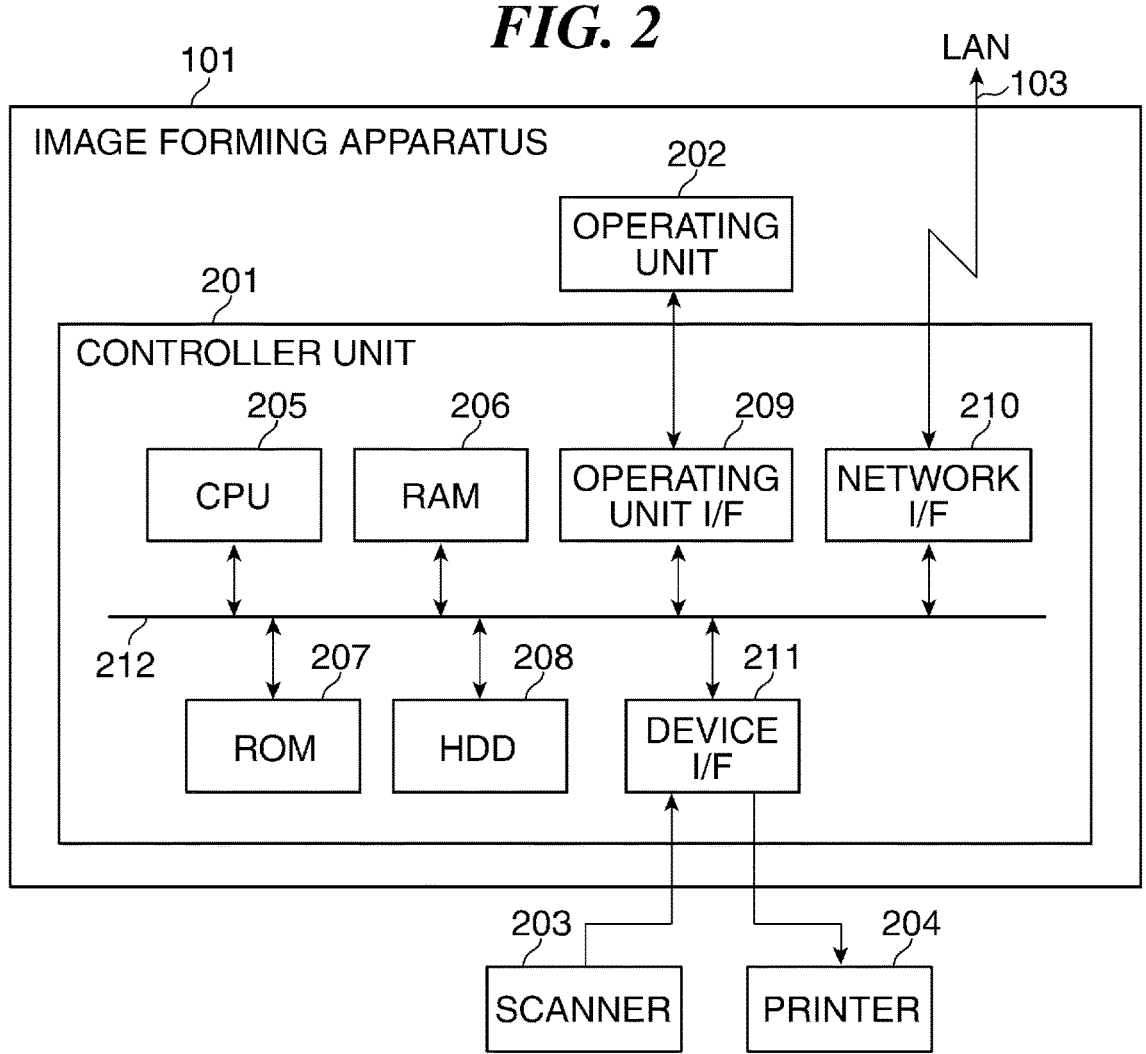
FIG. 2 is a block diagram schematically showing an internal arrangement of the image forming apparatus in FIG. 1.

FIG. 2 is a block diagram schematically showing an internal arrangement of the image forming apparatus 101 in FIG. 1.

The image forming apparatus 101 in FIG. 2 has a controller unit 201, an operating unit 202, a scanner 203, and a printer 204. The controller unit 201 has a CPU 205, a RAM 206, a ROM 207, an HDD 208, an operating unit I/F 209, a network I/F 210, and a device I/F 211, and these component elements are connected to one another via a system bus 212.

The CPU 205 controls the component elements of the image forming apparatus 101. The RAM 206 is a system work memory for the CPU 205 and stores programs and various data such as image data, an operating system, system software, and application software. The ROM 207 stores a boot program for the image forming apparatus 101. The HDD 208 stores an operating system, system software, application software, image data, setting data, and so on. The operating unit I/F 209 connects the controller unit 201 and the operating unit 202 together, the network unit I/F 210 connects the controller unit 201 and the LAN 103 together, and the device I/F 211 connects the controller unit 201 and the scanner 203 and the printer 204 together.

The operating unit 202 has hardware keys, an operating panel, and so on, and a user inputs instructions to the image forming apparatus 101 through the hardware keys and the operating panel. It should be noted that the operating panel may have, for example, a liquid crystal monitor, and for example, information on the image forming apparatus 101 is displayed on the liquid crystal monitor. The scanner 203 reads an image and generates image data based on the read image. The generated image data is stored in, for example, the HDD 208. The printer 204 prints, for example, print data stored in the HDD 208.

Figure 3:
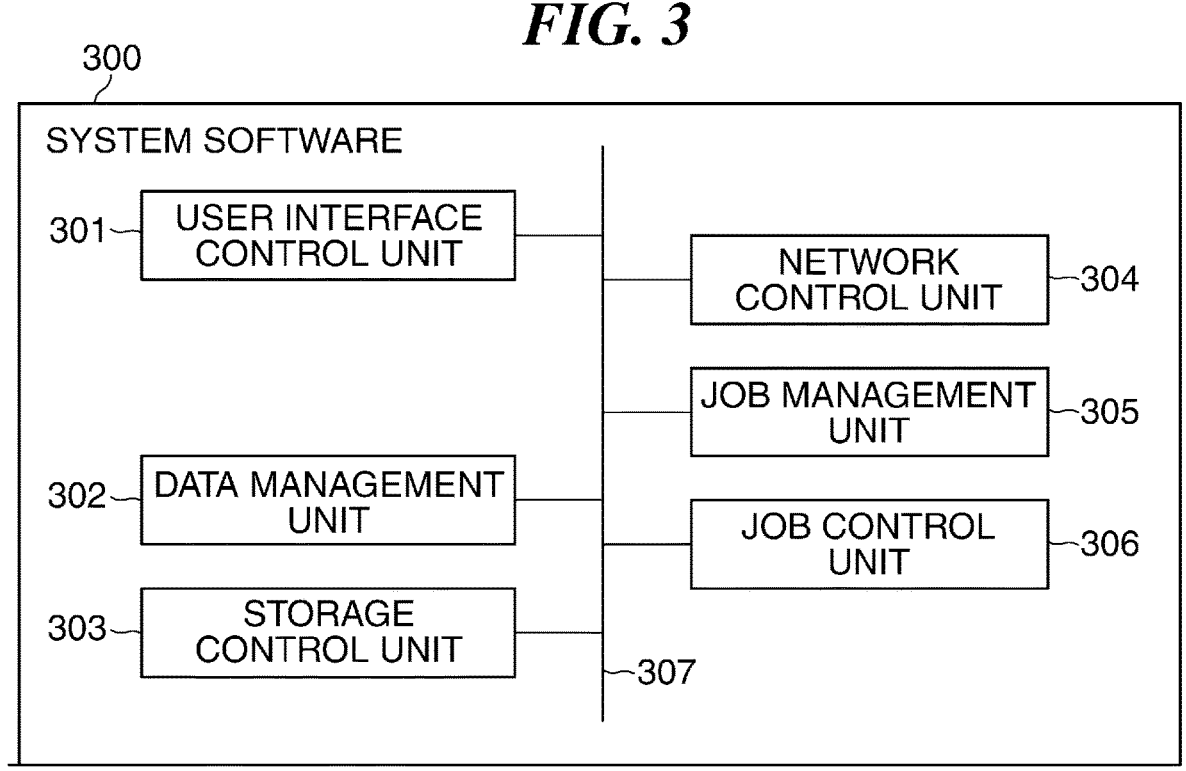
FIG. 3 is a block diagram schematically showing an internal arrangement of system software of the image forming apparatus, which is executed by a CPU of the image forming apparatus in FIG. 2.

FIG. 3 is a block diagram schematically showing an internal arrangement of system software 300 of the image forming apparatus 101, which is executed by the CPU 205 of the image forming apparatus 101 in FIG. 2.

The system software 300 in FIG. 3 has a user interface control unit 301, a data management unit 302, a storage control unit 303, a network control unit 304, a job management unit 305, and a job control unit 306, and these component elements are connected to one another via a bus 307.

The user interface control unit 301 receives information input by a user via the operating unit 202 and sends the received information to the data management unit 302 and the job management unit 305. The user interface control unit 301 also displays, on the operating unit 202, information received from the data management unit 302 and the job management unit 305.

The data management unit 302 receives a request relating to writing of data or readout of data from the user interface control unit 301, the network control unit 304, or the job management unit 305 and sends this request to the storage control unit 303. The data management unit 302 also receives a response to this request from the storage control unit 303 and sends this response to the user interface control unit 301, the network control unit 304, or the job management unit 305.

The storage control unit 303 receives a request relating to writing of data or readout of data from the data management unit 302, and for example, writes data into the HDD 208 or reads out data from the HDD 208. The storage control unit 303 then notifies the data management unit 302 of whether or not the writing or readout is successful. The network control unit 304 receives a request relating to processing from the PC 102 and sends this request to the data management unit 302 and the job management unit 305. The network control unit 304 also receives a response to this request from the data management unit 302 and the job management unit 305 and sends this response to the PC 102.

The job management unit 305 receives, for example, job execution requests from the user interface control unit 301 and the network control unit 304 and manages received jobs. The job management unit 305 also requests the job control unit 306 to execute the received jobs. Further, when, for example, a print job list, to be described later, is requested by the job control unit 306, the job management unit 305 requests the print job list from the user interface control unit 301. The job control unit 306 receives requests relating to job execution from the job management unit 305 and controls operation of the scanner 203 and the printer 204. The job control unit 306 also receives information on operating statuses of the scanner 203 and the printer 203 and sends the information on the operating statuses to the job management unit 305.

Figure 4:
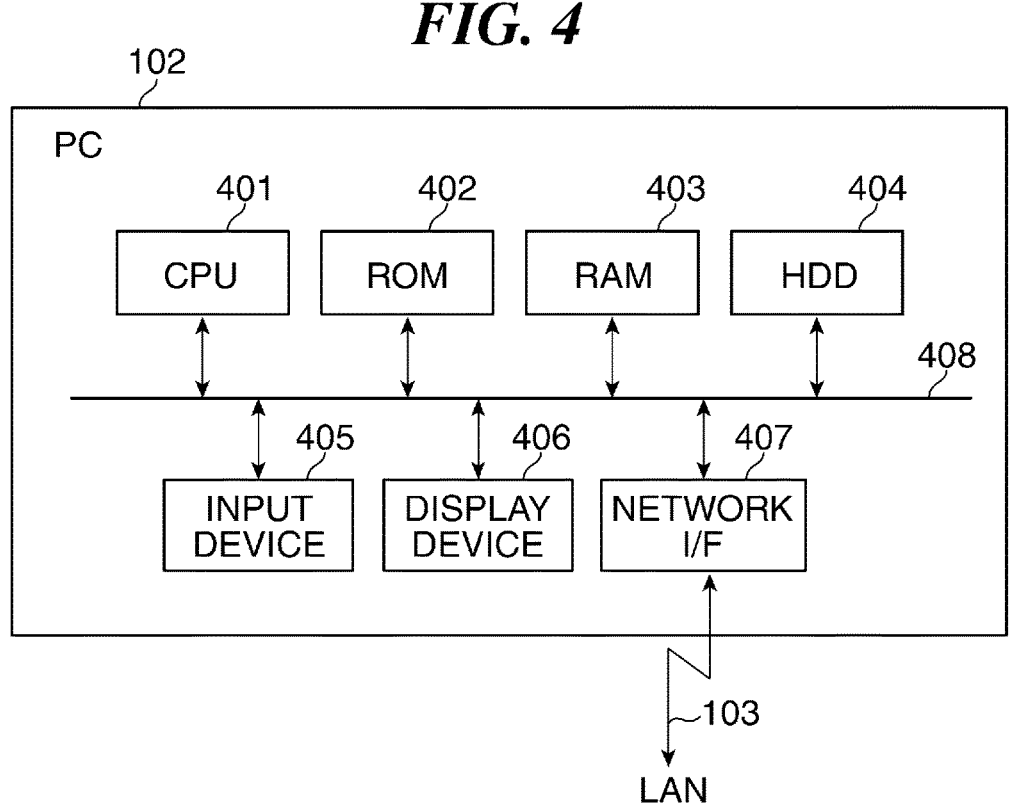
FIG. 4 is a block diagram schematically showing an internal arrangement of a PC in FIG. 1.

FIG. 4 is a block diagram schematically showing an internal arrangement of the PC 102 in FIG. 1.

The PC 102 in FIG. 4 has a CPU 401, a ROM 402, a RAM 403, an HDD 404, an input device 405, a display device 406, and a network I/F 407, and these component elements are connected to one another via a system bus 408.

The CPU 401 is a computation device which controls the overall system of the PC 102. The ROM 402 stores programs and data. The RAM 403 is a system work memory for the CPU 401 and stores, for example, image data. The HDD 404 stores programs, image data, application data, and so on. The input device 405 is, for example, a keyboard or a pointing device and used for a user to input instructions to the PC 102. The display device 406 displays an operating condition of the PC 102 and information on programs running on the PC 102. The network I/F 407 connects the PC 102 and the LAN 103 together, and the PC 102 and the image forming apparatus 101 communicate with each other via the LAN 103.

Figure 5:
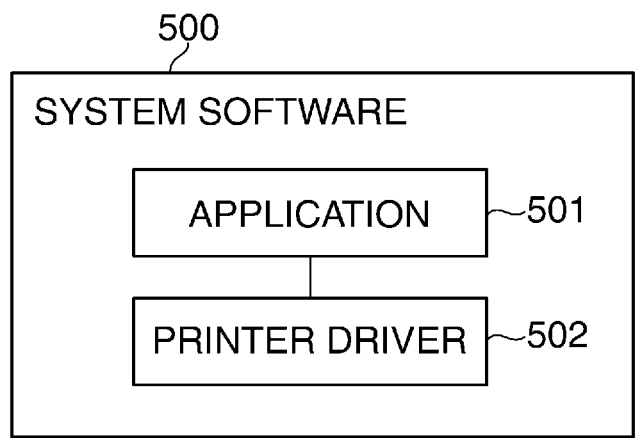
FIG. 5 is a block diagram schematically showing an internal arrangement of system software of the PC, which is executed by a CPU of the PC in FIG. 4.

FIG. 5 is a block diagram schematically showing an internal arrangement of system software 500 of the PC 102, which is executed by the CPU 401 of the PC 102 in FIG. 4.

The system software 500 has an application 501 and a printer driver 502, which is connected to the application 501. The application 501 is, for example, software which creates or edits image data and document data. For example, a user creates document data using the application 501 and sends the created document data as a print job to the image forming apparatus 101 via the printer driver 502. The printer driver 502 allows designation of the number of print copies and banner printing. It should be noted that banner printing is designated, a recording sheet on which a job name of a print job, the date and time at which the print job was sent to the image forming apparatus 101, a user name of a user who sent the print job to the image forming apparatus 101, and so on are written (hereafter referred to as "a banner sheet") is printed when the print job is executed.

Figure 6:
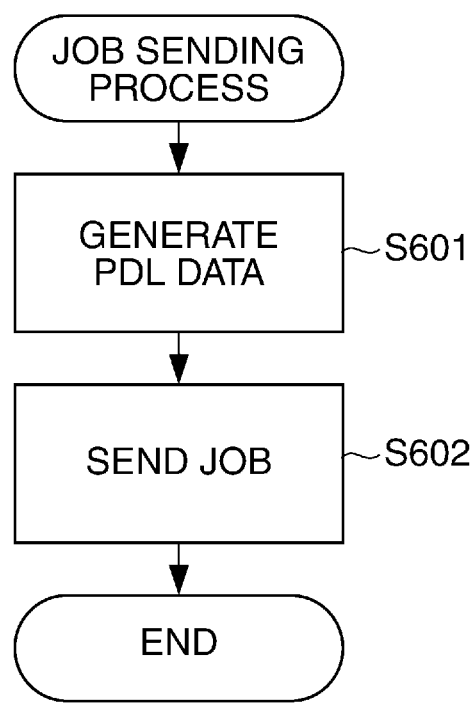
FIG. 6 is a flowchart showing the procedure of a job sending process which is carried out by a printer driver in FIG. 5.

FIG. 6 is a flowchart showing the procedure of a job sending process which is carried out by the printer driver 502 in FIG. 5. The process in FIG. 6 is carried out when the printer driver 502 sends a print job from the PC 102 to the image forming apparatus 101.

Referring to FIG. 6, first, the printer driver 502 generates PDL (page description language) data from print data which has been designated by a user as data to be printed (step S601), sends the PDL data as a print job to the image forming apparatus 101 (step S602), and terminates the present process.

Figure 7:
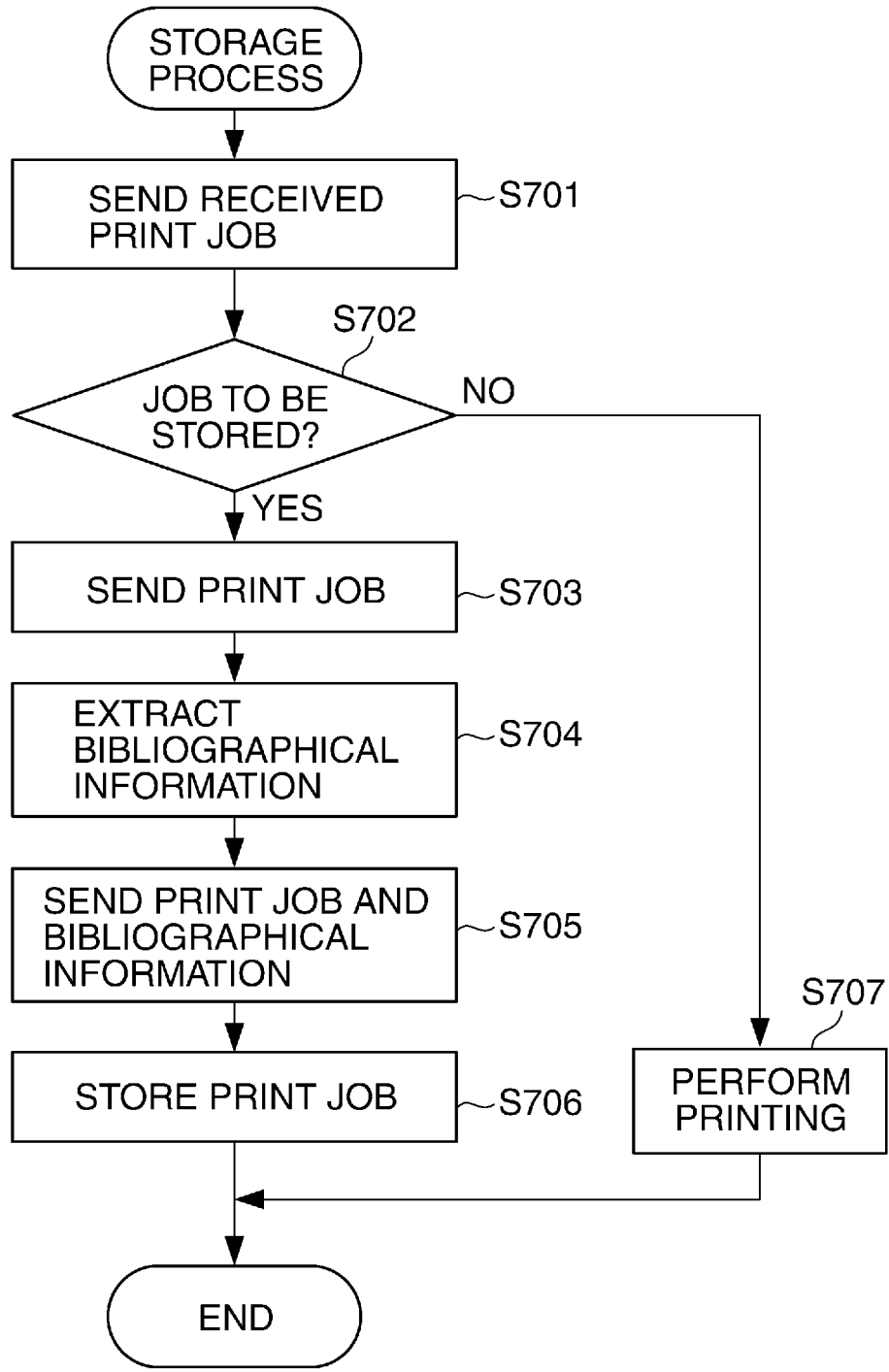
FIG. 7 is a flowchart showing the procedure of a storage process in which a print job sent to the image forming apparatus in step S602 in FIG. 6 is stored in the image forming apparatus.

FIG. 7 is a flowchart showing the procedure of a storage process in which a print job sent to the image forming apparatus 101 in the step S602 in FIG. 6 is stored in the image forming apparatus 101.

Referring to FIG. 7, first, the network control unit 304 receives a print job from the PC 102 and sends the received print job to the job management unit 305 (step S701). The job management unit 305 receives the print job and determines whether or not the print job needs to be stored in the HDD 208 (hereafter referred to as "a job to be stored") (step S702). It should be noted that whether or not the print job is a job to be stored is determined based on, for example, at least one of the following: a print job name, a user name of a user who sent the print job from the PC 102, and identification information on the PC 102.

As a result of the determination in the step S702, when the print job is a job to be stored, the job management unit 305 sends the print job to the data management unit 302 (step S703). The data management unit 302 analyzes the received print job and extracts bibliographical information on the print job (step S704) and sends the print job and the extracted bibliographical information to the storage control unit 303 (step S705). The storage control unit 303 stores the received print job and bibliographical information as a bibliographical information list 800, to be described later, in the HDD 208 (step S706) and terminates the present process.

As a result of the determination in the step S702, when the print job is not a job to be stored, the job management unit 305 requests the job control unit 306 to execute the print job, and the job control unit 306 controls the printer 204 to execute the print job (step S707) and terminates the present process.

FIG. 8 is a view useful in explaining the bibliographical information list 800 stored in the HDD 208 in the step S706 in FIG. 7.

Bibliographical information 806 corresponding to print jobs is recorded in the bibliographical information list 800 in FIG. 8. The bibliographical information 806 includes dates and times 801, user names 802, storage locations 803, a print job names 804, and print settings 805. At the dates and times 801, users indicated as the user names 802 issue instructions to send print jobs corresponding to respective pieces of the bibliographical information 806 from the PC 102 to the image forming apparatus 101, and the print jobs are stored in the storage locations 803. The print job names 804 and the print settings 805 in the bibliographical information 806 are names of and print settings on print jobs concerned.

Figure 9:
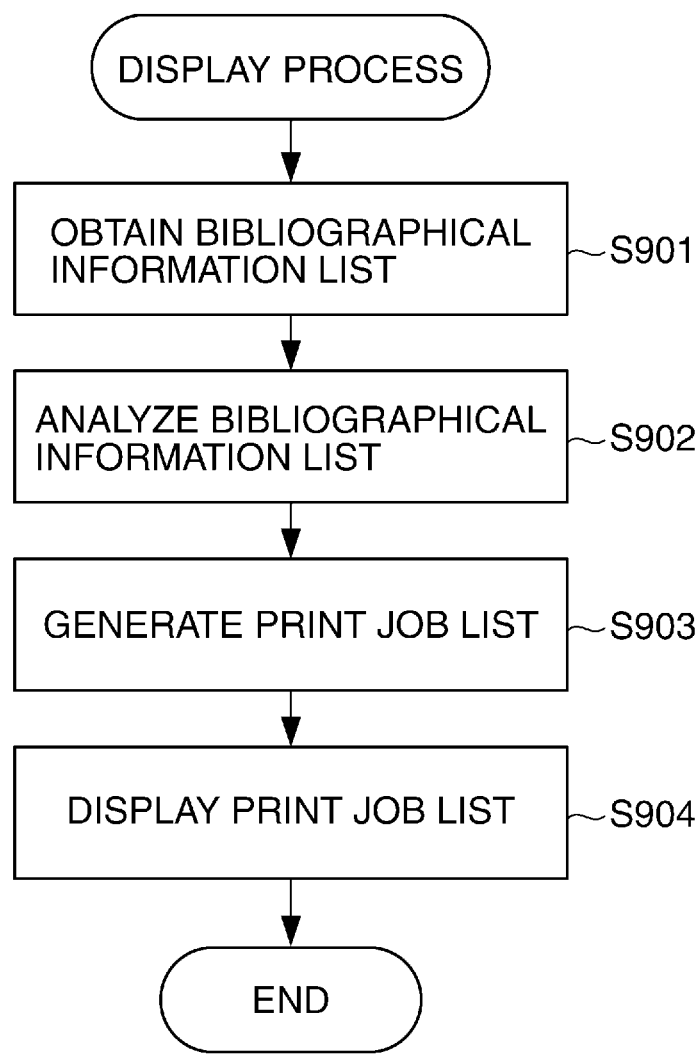
FIG. 9 is a flowchart showing the procedure of a display process in which a print job list which is a list of print jobs stored in the HDD in the storage process in FIG. 7 is displayed.

FIG. 9 is a flowchart showing the procedure of a display process in which a print job list which is a list of print jobs stored in the HDD 208 in the storage process in FIG. 7 is displayed. The process in FIG. 9 is carried out by the user interface control unit 301.

In the process in FIG. 9, first, the user interface control unit 301 requests a print job list from the job management unit 305. The job management unit 305 obtains the bibliographical information list 800 from the data management unit 302 and sends the obtained bibliographical information list 800 to the user interface control unit 301 (step S901). The user interface control unit 301 analyzes the received bibliographical information list 800 (step S902), generates a print job list 1000, to be described below (step S903), displays the print job list 1000 on the operating unit 202 (step S904), and terminates the present process.

Figure 10:
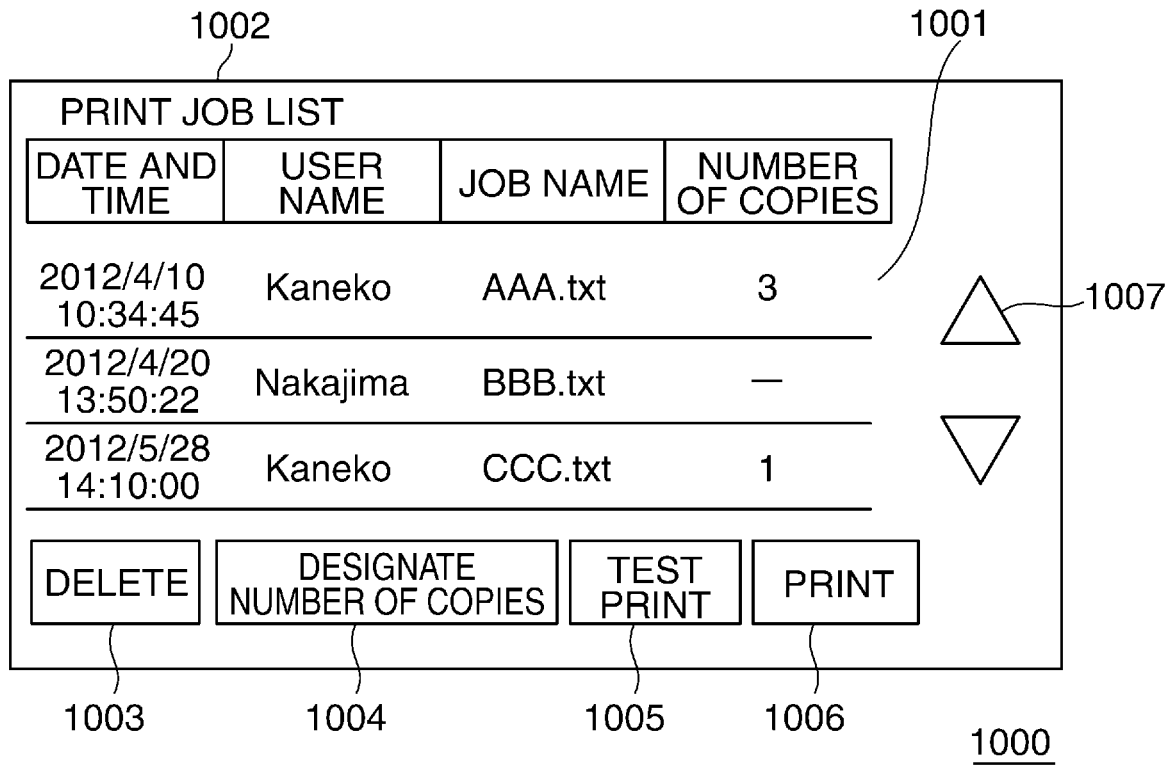
FIG. 10 is a view useful in explaining the print job list which is generated in step S903 in FIG. 9.

FIG. 10 is a view useful in explaining the print job list 1000 which is generated in the step S903 in FIG. 9.

The print job list 1000 in FIG. 10 has a bibliographical information display area 1001, a delete button 1003, a number-of-copies designation button 1004, a test print button 1005, a print button 1006, and a scroll button 1007. Bibliographical information 1002 corresponding to print jobs is displayed in the bibliographical information display area 1001. The delete button 1003 is depressed to delete the bibliographical information 1002 selected by a user, and the number-of-copies designation button 1004 is depressed to change the number of print copies in the bibliographical information 1002 selected by a user.

The test print button 1005 is depressed to perform test printing for a print job relating to the bibliographical information 1002 selected by a user (executing instruction accepted). The print button 1006 is depressed to execute a print job, and the scroll button 1007 is depressed to display the bibliographical information 1002 which is not being displayed in the bibliographical information display area 1001.

Figure 11:
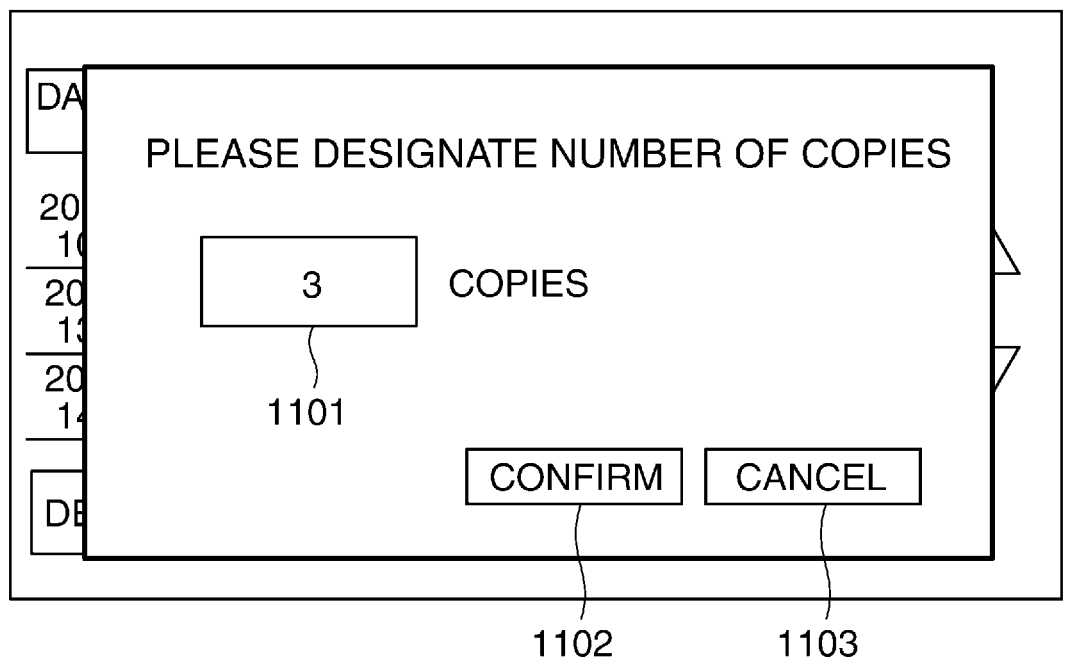
FIG. 11 is a view useful in explaining a number-of-copies designation screen which is displayed on an operating unit when a number-of-copies designation button in FIG. 10 is depressed.

When the number-of-copies designation button 1004 is depressed, the user interface control unit 301 displays a number-of-copies designation screen 1100 in FIG. 11. The number-of-copies designation screen 1100 has an input area 1101, a confirm button 1102, and a cancel button 1103. When a user desires to change the number of print copies in the bibliographical information 1002, he or she enters the number of print copies desired in the input area 1101 and depresses the confirm button 1102 to thus change the number of print copies. When the user depresses the cancel button 1103, the print job list 1000 is displayed again on the operating unit 202 with the number of print copies in the bibliographical information 1002 unchanged.

Figure 12:
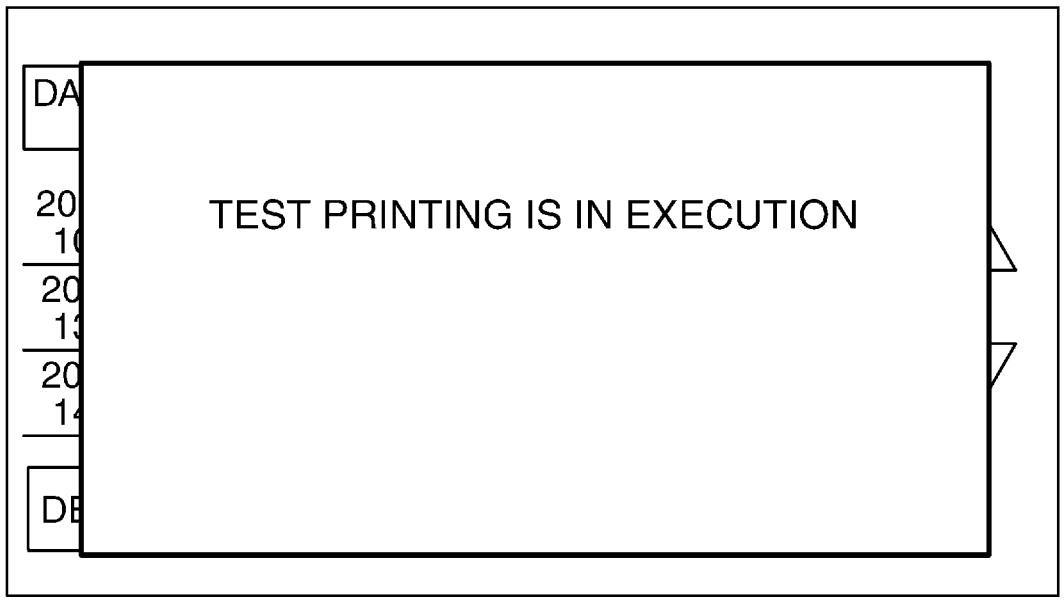
FIG. 12 is a view useful in explaining a test printing in-execution screen which is displayed on the operating unit when a test print button in FIG. 10 is depressed.
Figure 13:
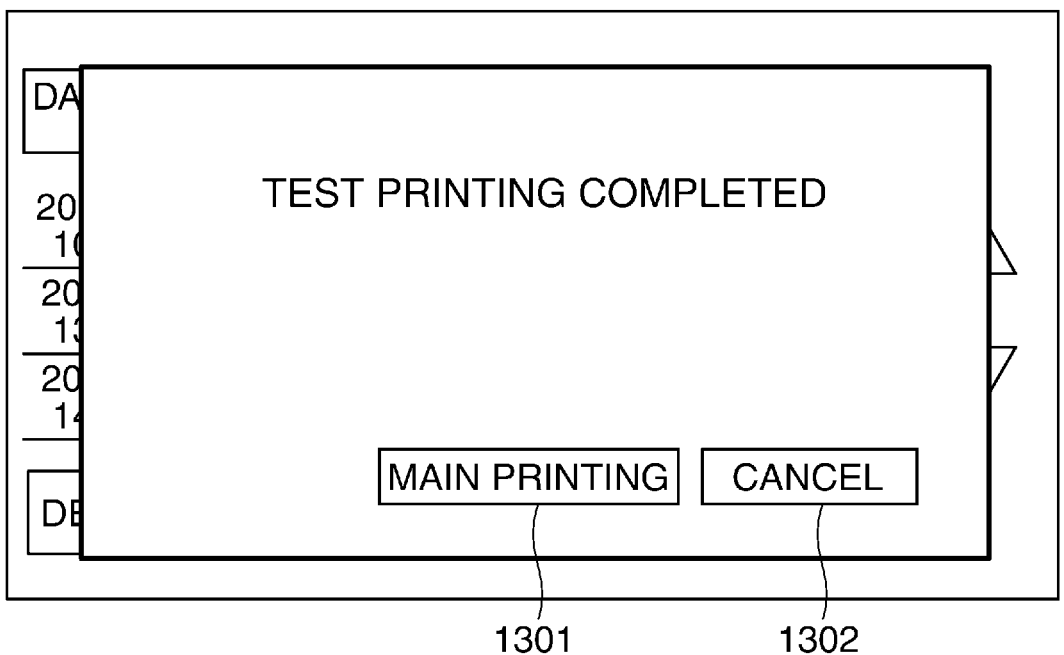
FIG. 13 is a view useful in explaining a test printing completion screen which is displayed on the operating unit when test printing performed in response to depression of the test print button in FIG. 10 is completed.

When the test print button 1005 is depressed, the user interface control unit 301 displays a test printing in-execution screen 1200 (FIG. 12), by which a user recognizes that test printing is being in execution, on the operating unit 202, and when test printing is completed, displays a test printing completion screen 1300 (FIG. 13) on the operating unit 202. The test print completion screen 1300 has a main print button 1301 and a cancel button 1302. A user depresses the main print button 1301 when a desired printing result has been obtained as a result of test printing, for example, when a printing result of which characters and figures match a user's expectation has been obtained, and the user depresses the cancel button 1302 when a desired printing result has not been obtained.

When the main print button 1301 is depressed, the user interface control unit 301 requests the job control unit 306 to perform main printing via the job management unit 305, and the job control unit 306 controls the printer 204 to perform main printing. When the cancel button 1302 is depressed, the print job list 1000 is displayed again on the operating unit 202.

Figure 14:
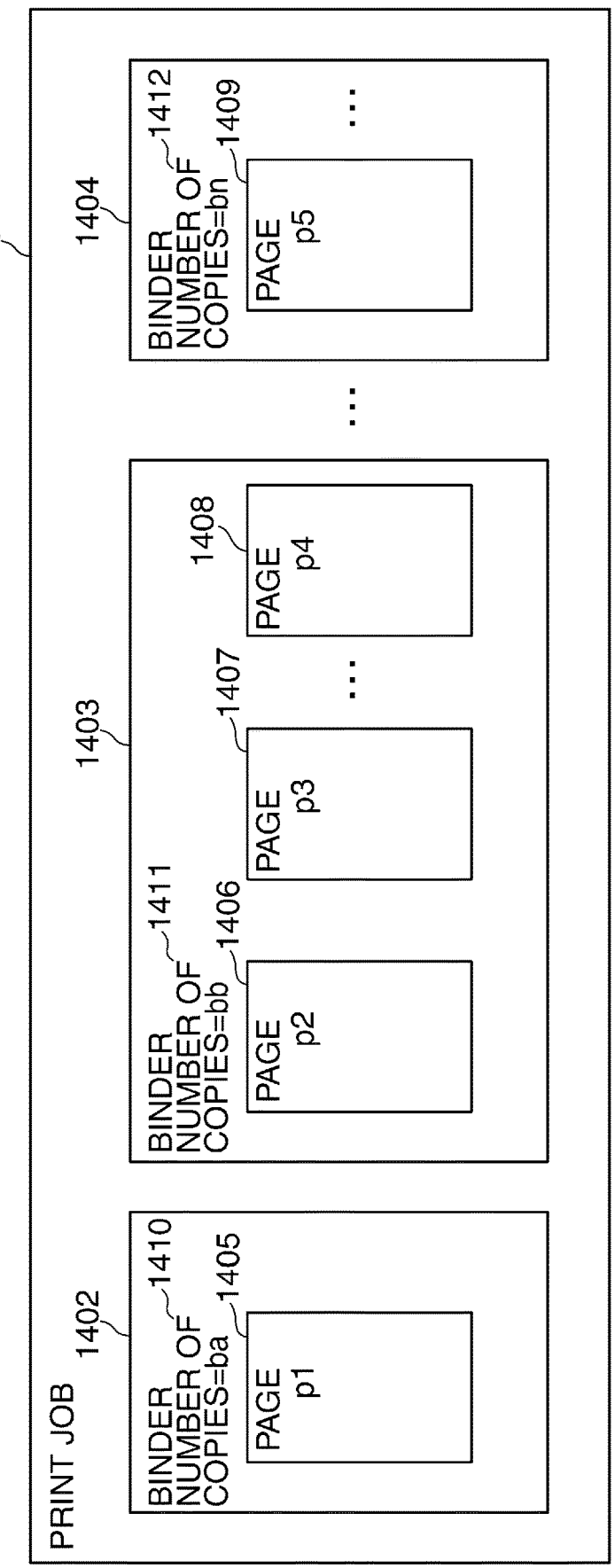
FIG. 14 is a view useful in explaining an exemplary structure of a print job which is executed by a job control unit in FIG. 3.

FIG. 14 is a view useful in explaining an exemplary structure of a print job 1401 which is executed by the job control unit 306 in FIG. 3.

The print job 1401 is comprised of a plurality of sections displayed as binders 1402 to 1404 in FIG. 14. The binder 1402 has a page 1405, the binder 1403 has pages 1406 to 1408, and the binder 1404 has a page 1409.

Printing results corresponding to the respective binders 1402 to 1404 are subjected to a finishing process such as a stapling process, a punching process, a double-sided printing process, or a number of print copies printing process. Also, for example, the binder 1402 is subjected to one-sided printing, and the binders 1403 and 1404 are subjected to double-sided printing. Further, the binders 1402 to 1404 have the number of binder copies 1410 to 1412, respectively, which show the number of print copies to be made from themselves, and the number of binder copies 1410 to 1412 define the number of print copies to be made from the binders 1402 to 1404, respectively. The pages 1405 to 1409 are subjected to printing control such as a color printing process and a number of print copies printing process on a page-by-page basis.

Figure 15:
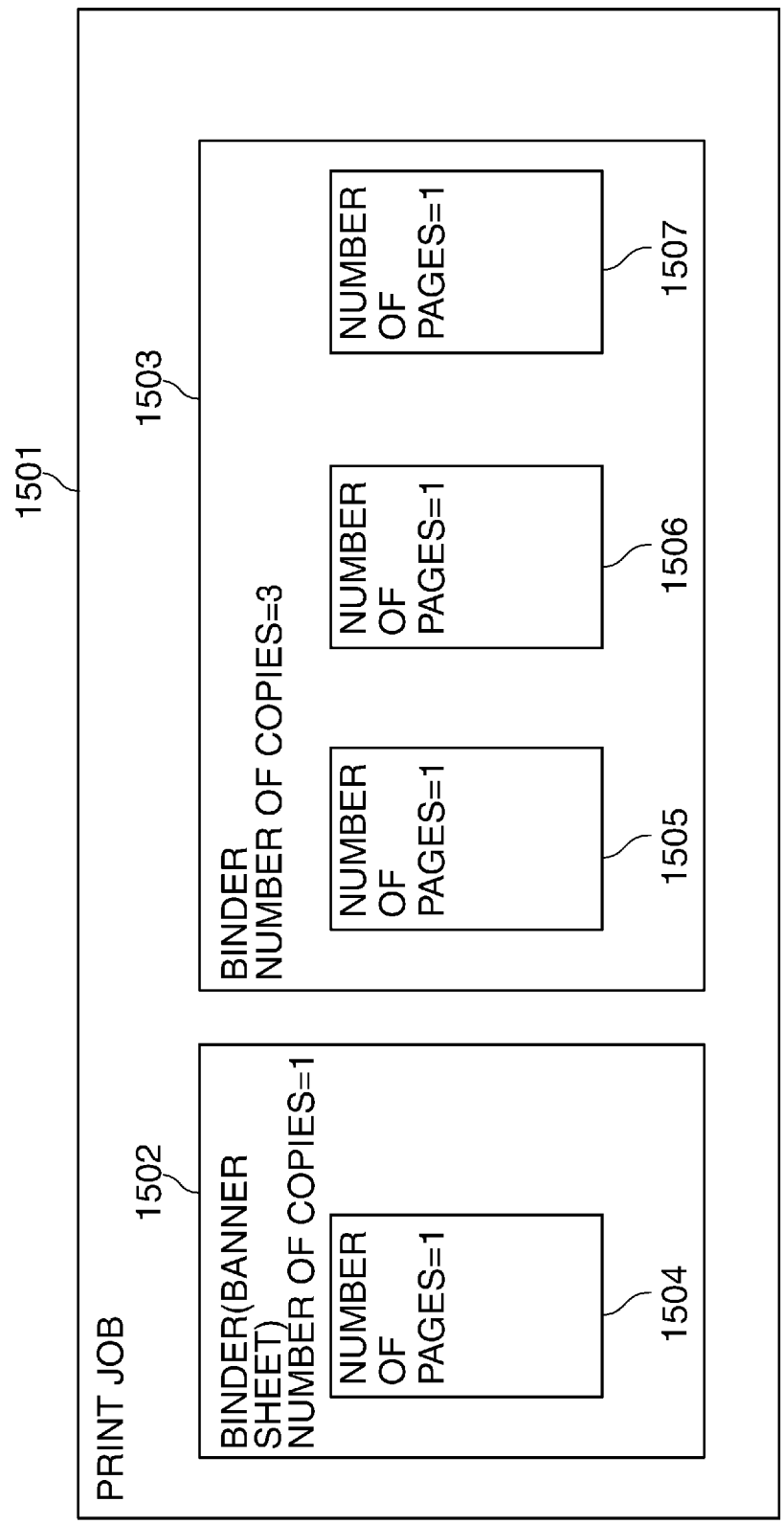
FIG. 15 is a view useful in explaining an exemplary structure of a banner print job which is an example of the print job in FIG. 14.

FIG. 15 s a view useful in explaining an exemplary structure of a banner print job which is an example of the print job 1401 in FIG. 14.

The banner print job 1501 is comprised of two sections which are displayed as binders 1502 and 1503 in FIG. 15. The binder 1502 has a page 1504, and the binder 1503 has pages 1505 to 1507. The page 1504 is a banner sheet, and the pages 1505 to 1507 are, for example, documents created by a user.

In the present embodiment, each of the pages 1504 to 1507 is comprised of one document, and the number of binder copies (the number of print copies) for the binder 1502 is one, and the number of print copies for the binder 1503 is three. Thus, when the banner print job 1501 is executed, one printing result is obtained for the page 1504, and about three printing results are obtained for each of the pages 1505 to 1507. It should be noted that to perform test printing for the banner print job 1501, a user does not have to check a printing result for the page 1504, which is a banner sheet, in many cases. In this case, test printing for the page 1504 may be dispensed with.

Figure 16:
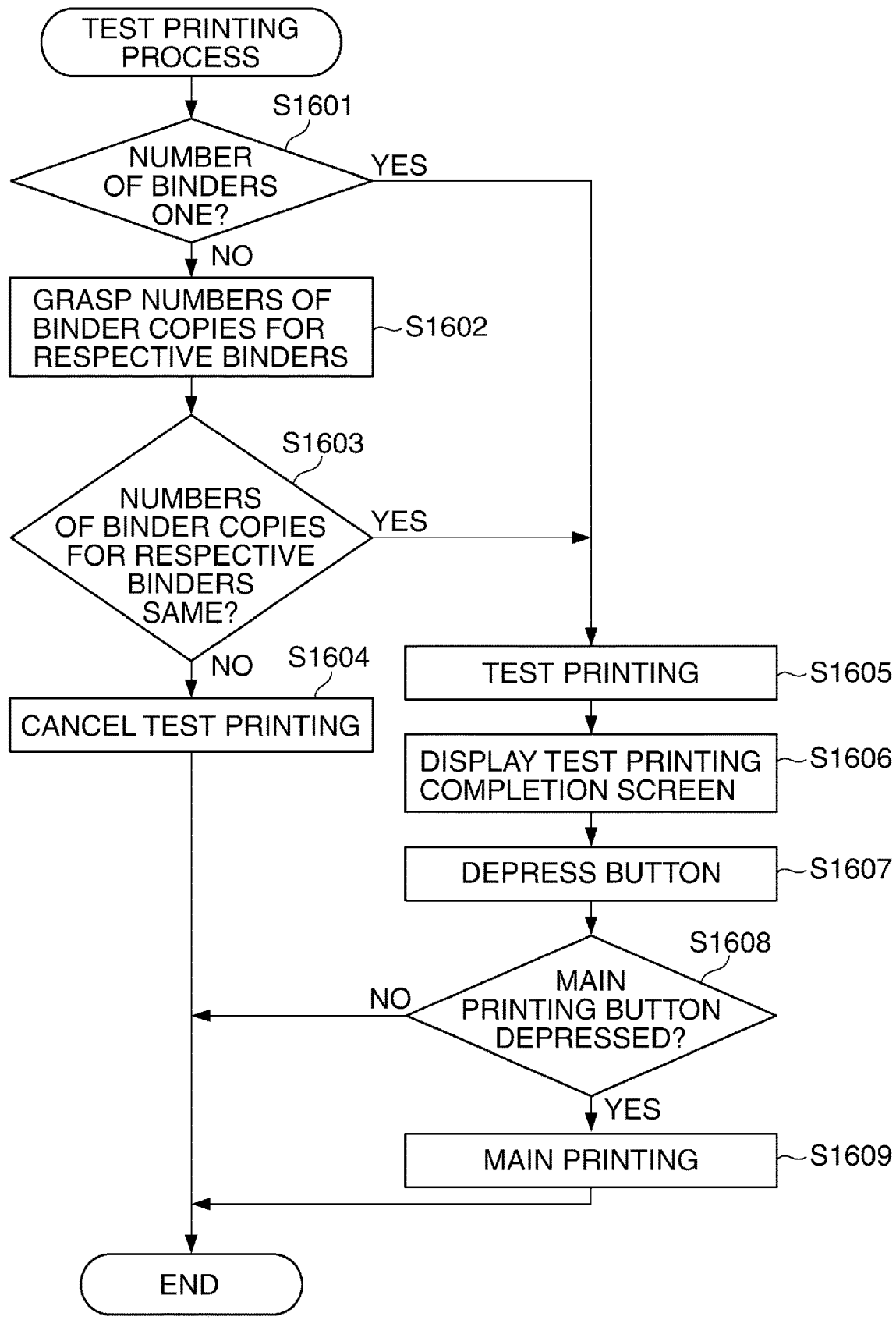
FIG. 16 is a flowchart showing the procedure of a test printing process in which test printing is performed for the print job in FIG. 14.

FIG. 16 is a flowchart showing the procedure of a test printing process in which test printing is performed for the print job 1401 in FIG. 14. The process in FIG. 16 is started when the test print button 1005 is depressed with any one of print jobs selected on the print job list in FIG. 10.

Referring to FIG. 16, first, the user interface control unit 301 analyzes the print job 1401 selected by a user and determines whether or not the number of binders constituting the print job 1401 is one (step S1601). As a result of the determination in the step S1601, when the number of binders constituting the print job 1401 is not one, the user interface control unit 301 grasps the numbers of binder copies (the number of print copies) for respective binders (step S1602) and determines whether or not the grasped numbers of binder copies for the respective binders are the same (step S1603).

As a result of the determination in the step S1601, when the number of binders constituting the print job 1401 is one, the user interface control unit 301 requests the job management unit 305 to perform test printing for the print job 1401 (step S1605), and when test printing is completed, the user interface control unit 301 displays the test printing completion screen 1300 on the operating unit 202 (step S1606). The user then depresses the main print button 1301 or the cancel button 1302 (step S1607), and the user interface control unit 301 determines whether or not the button depressed by the user is the main print button 1301 (step S1608).

As a result of the determination in the step S1608, when the main print button 1301 is depressed, the user interface control unit 301 performs main printing (step S1609) and terminate the present process. As a result of the determination in the step S1608, when the cancel button 1302 is depressed, the present process is terminated with the step S1609 skipped.

As a result of the determination in the step S1603, when the numbers of binder copies for the respective binders are not the same, test printing is canceled (restricted) (step S1604), followed by termination of the present process. As a result of the determination in the step S1603, when the numbers of binder copies for the respective binders are the same, the process proceeds to the step S1605.

It should be noted that when the processes in the steps S1602 and S1603 are skipped, and it is determined in the step S1601 that the number of binder copies is not one, the process may proceed to the step S1604.

Figure 17:
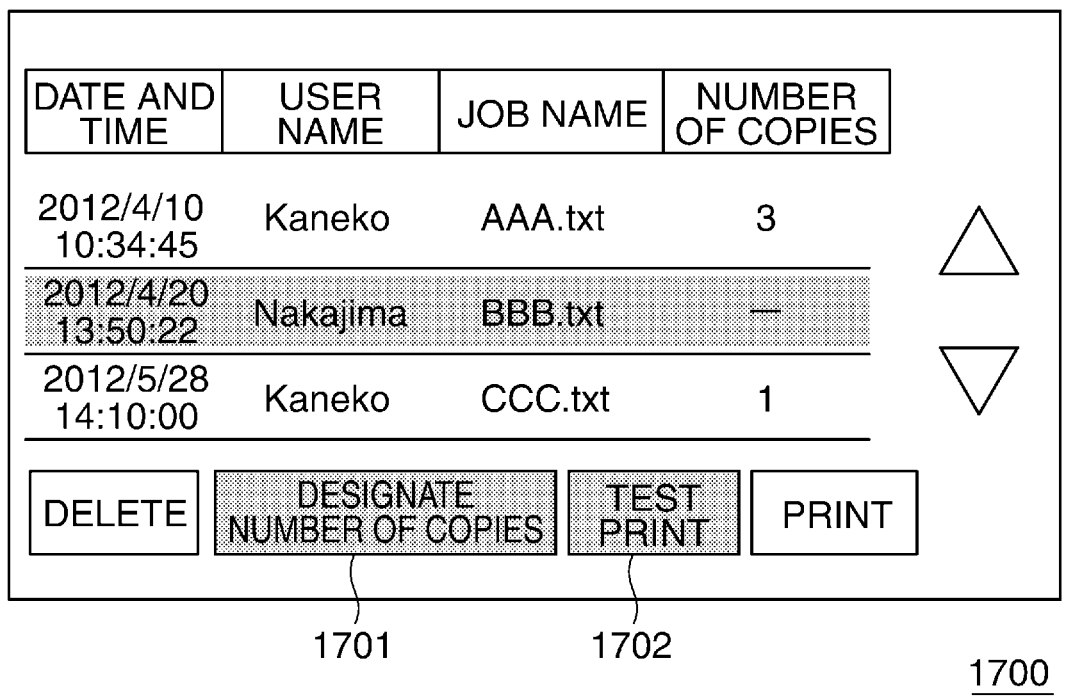
FIG. 17 is a view showing a first variation of the test printing process in FIG. 16.

FIG. 17 is a view showing a first variation of the test printing process in FIG. 16. According to the flowchart in FIG. 16, the processes in the step S1601 and the subsequent steps are carried out after the test print button 1005 is depressed, whereas according to the first variation, the processes in the steps S1601 to S1603 are carried out in response to any one of print jobs being selected on the print job list in FIG. 10.

When it is determined in the step S1601 that the number of binders is one, or when it is determined in the step S1603 that the numbers of binder copies are the same, the number-of-copies designation button 1004 and the test print button 1005 are displayed in an operable state as shown in FIG. 10. On the other hand, when it is determined in the step S1603 that the numbers of binder copies for the respective binders are not the same, a print job list 1700 is displayed with a number-of-copies designation button 1701 and a test print button 1702 in an inoperable state (shaded state) as shown in FIG. 17.

It should be noted here that when the processes in the steps S1602 and S1603 are skipped, and it is determined in the step S1601 that the number of binders is not one, the number-of-copies designation button 1701 and the test print button 1005 may be displayed in an inoperable state (shaded state) as shown in FIG. 17.

Figure 18:
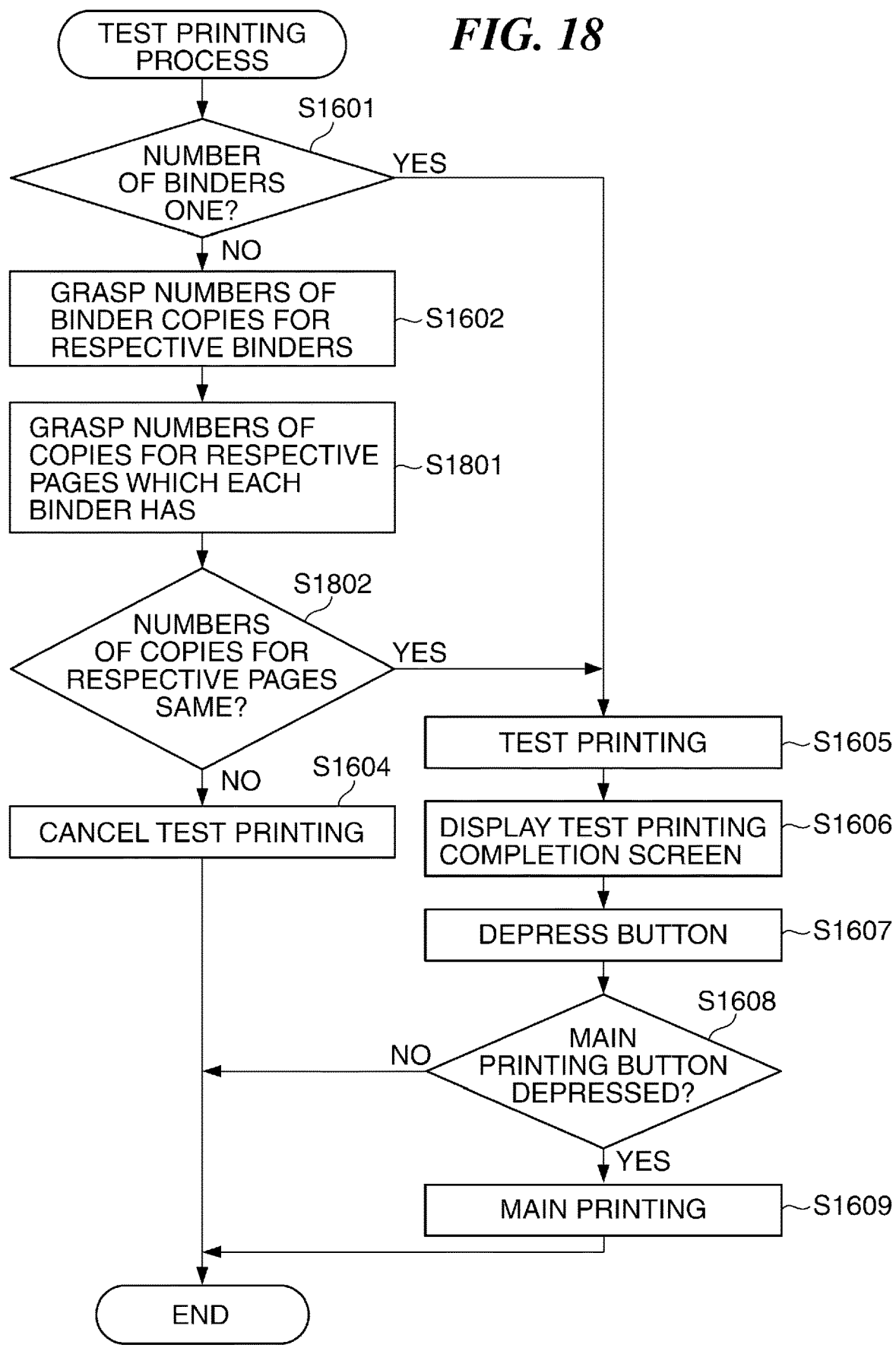
FIG. 18 is a flowchart showing the procedure of a second variation of the test printing process in FIG. 16.

FIG. 18 is a flowchart showing a second variation of the test printing process in FIG. 16. The process in FIG. 18 differs from the process in FIG. 16 in that test printing is canceled when the numbers of print copies for respective pages which each binder has are not the same. It should be noted that processes in steps S1601 to S1602 and S1604 to S1609 in FIG. 18 are the same as those in the steps S1601 to S1602 and S1604 to S1609 in FIG. 16, and therefore, only features different from the process in FIG. 16 will be described below.

As a result of the determination in the step S1601, when the number of binders constituting the print job 1401 is not one, the user interface control unit 301 grasps the numbers of binders for respective binders (step S1602), grasps the numbers of print copies designated for respective pages which each binder has (step S1801), and determines whether or not the numbers of print copies designated for the respective pages are the same (step S1802).

As a result of the determination in the step S1802, when the numbers of print copies designated for the respective pages are the same, the process proceeds to the step S1605, and when the numbers of print copies designated for the respective pages are not the same, the process proceeds to the step S1604. It should be noted that the processes in the steps S1802 and S1604 to S1609 are carried out on a binder-by-binder basis.

According to the processes in FIGS. 16 to 18, when the numbers of binder copies for respective binders constituting the print job 1401 are not the same, or when the numbers of print copies designated for respective pages which each binder has are not the same, test printing is canceled (step S1604). When the numbers of binder copies set for respective binders constituting the print job 1401 or the numbers of print copies set for respective pages are the same, the number of print copies is counted with respect to a printing result of one binder or one page to estimate (grasp) the number of print copies of printing results of other binders or other pages, counting of the number of print copies does not require too much time and effort, and a user is unlikely to be confused.

On the other hand, when the numbers of binder copies set for respective binders or the number of print copies set for respective pages are different, a user needs to count the number of print copies with respect to printing results of the respective binders or the respective pages. Particularly if test printing and main printing are distinguished when there are a number of binders or pages, a user needs to count the number of print copies of printing results of test printing and printing results of main printing with respect to each binder or each page, and hence counting of the number of print copies requires greater time and effort, which may confuse the user.

On the other hand, in the processes in FIGS. 16 to 18, when the numbers of binder copies set for respective binders or the number of print copies set for respective pages are different, test printing is canceled to eliminate the need for a user to count the number of print copies of printing results of test printing and the number of print copies of printing results of main printing, and as a result, the user will not be confused when print data comprised of a plurality of sections is printed by the image forming apparatus having the test printing function.

Moreover, when the print job 1401 is selected on the print job list 1000 displayed on the operating unit 202, and the numbers of binder copies set for respective binders constituting the print job 1401 or the numbers of print copies set for respective pages are different, the number-of-copies designation button 1701 and the test print button 1702 are rendered inoperable as shown in the job list 1700. As a result, when the print job 1401 is selected, a user recognizes that test printing is not allowed to be performed, and this prevents the user from continuing operation while falsely recognizing that test printing is allowed to be performed.

Figure 19:
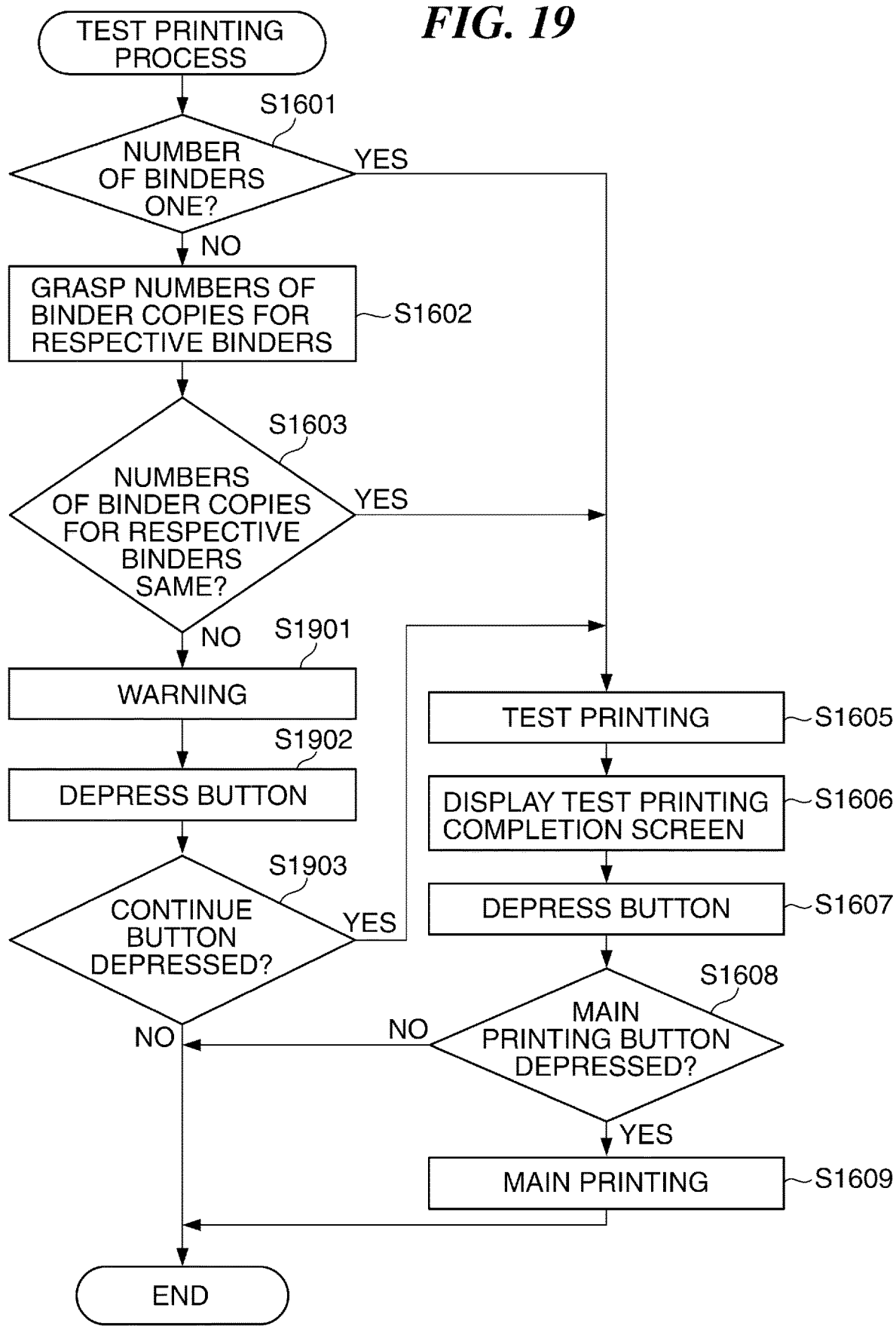
FIG. 19 is a flowchart showing the procedure of a third variation of the test printing process in FIG. 16.

FIG. 19 is a flowchart showing a third variation of the test printing process in FIG. 16. The process in FIG. 19 differs from the process in FIG. 16 in that test printing is not canceled when the numbers of binder copies for respective binders are not the same. Processes in steps S1601 to S1603 and S1605 to S1609 in FIG. 19 are the same as those in the steps S1601 to S1603 and S1605 to S1609 in FIG. 16, and therefore, only features different from the processes in FIG. 16 will be described below.

As a result of the determination in the step S1603, when the numbers of binder copies for respective binders are not the same, the user interface control unit 301 displays, on the operating unit 202, a warning screen 2000 (predetermined confirmation screen) (FIG. 20) to indicating that test printing is to be performed (step S1901). The warning screen 2000 has a continue button 2001 and a cancel button 2002, and when a user depresses the continue button 2001 or the cancel button 2002 (step S1902), the user interface control unit 301 determines whether or not the button depressed by the user is the continue button 2001 (step S1903). As a result of the determination in the step S1903, when the button depressed by the user is the continue button 2001, the process proceeds to the step S1605, and when the button depressed by the user is the cancel button 2001, the present process is terminated.

According to the process in FIG. 19, when the numbers of binder copies for respective binders constituting the print job 1401 are not the same, the warning screen 2000 is displayed before test printing is performed (step S1901), and hence the user recognizes that it is necessary to count the number of print copies of printing results of test printing and printing results of main printing with respect to each binder. As a result, before test printing is performed, the user estimates time and effort required later to count the number of print copies. Namely, greater time and effort than expected by the user is prevented from being required to count the number of print copies, and as a result, the user will not be confused when print data comprised of a plurality of sections is printed by the image forming apparatus having the test printing function.

Figure 21:
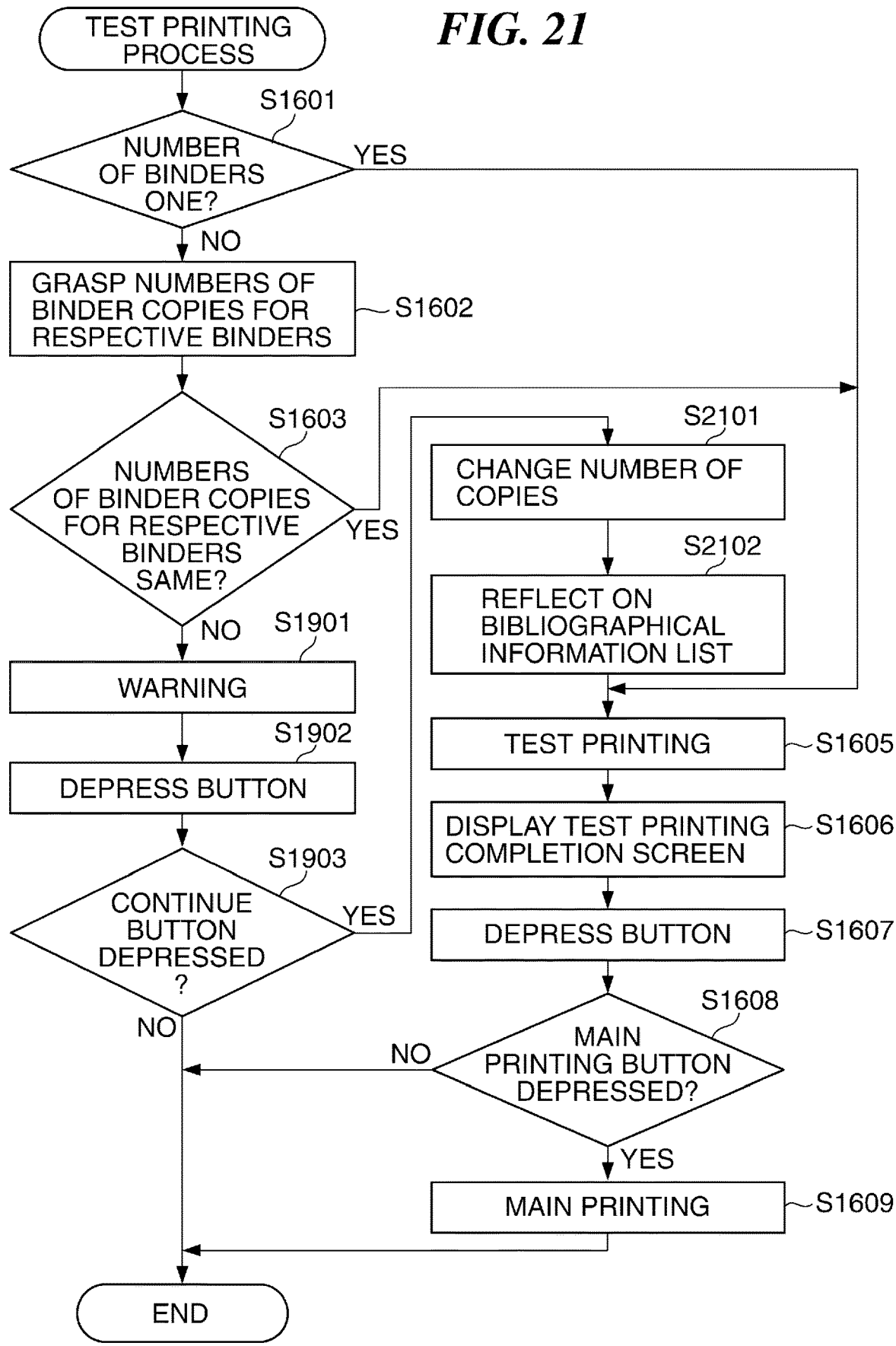
FIG. 21 is a flowchart showing the procedure of a variation of the test printing process in FIG. 19.

FIG. 21 is a flowchart showing a variation of the test printing process in FIG. 19. Processes in steps S1601 to S1603, S1605 to S1609, and S1901 to S1903 in FIG. 21 are the same as those in the steps S1601 to S1603, S1605 to S1609, and S1901 to S1903 in FIG. 19, and therefore, only features different from the processes in FIG. 19 will be described below.

Figure 20:
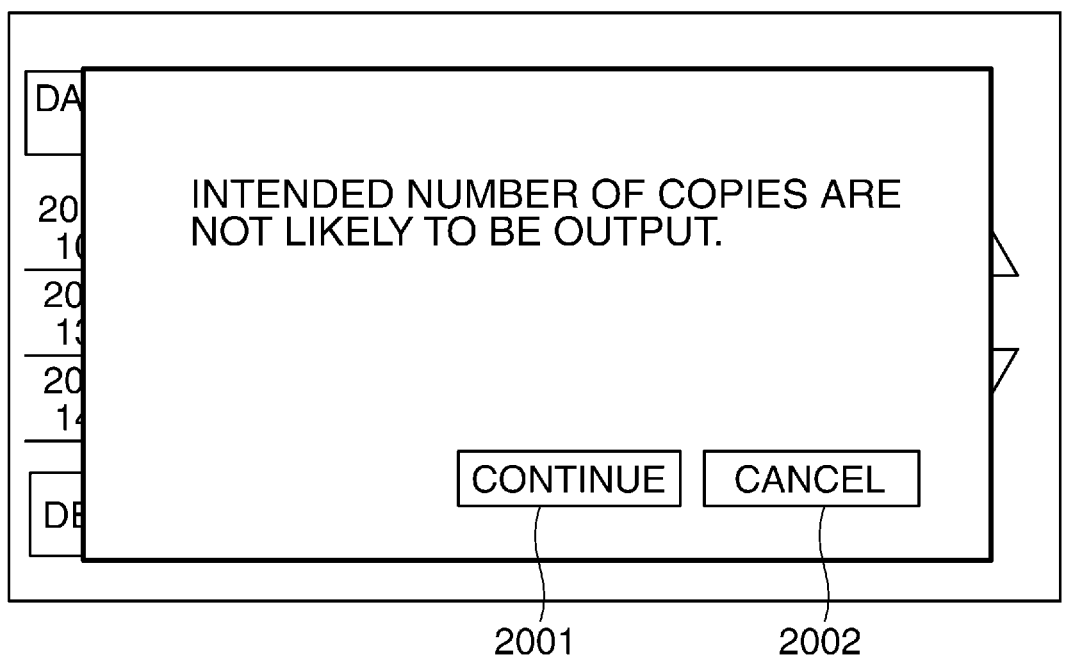
FIG. 20 is a view useful in explaining a warning screen which is displayed on the operating unit in step S1901 in FIG. 19.

The user interface control unit 301 determines whether or not the button depressed by the user in the step S1902 is the continue button 2001 in FIG. 20 (step S1903). As a result of the determination in the step S1903, when the button depressed by the user is the continue button 2001, the number-of-copies designation screen 1100 is displayed on the operating unit 202, and the user enters the number of print copies he or she desires into the input area 1101 and depresses the confirm button 1102. When the confirm button 1102 is depressed, the number of print copies is changed to the number of print copies the user has input (step S2101), and the changed number of print copies is reflected on the print setting 805 in the bibliographical information list 800 by way of the job management unit 305 and the data management unit 302 (step S2102), followed by the process proceeding to the step S1605.

According to the process in FIG. 21, since the number of binder copies for each of a plurality for binders constituting print data is changed after it is indicated that test printing is to be performed (step S2101), the user is allowed to change the number of print copies of printing results to be eventually obtained from the set number of print copies, and it is thus possible to flexibly respond to a user's request to change the number of print copies. Moreover, according to the process in FIG. 21, the user who has recognized that the numbers of binder copies for respective binders are not the same by looking at the warning screen 2000 changes the numbers of binder copies so that the numbers of binder copies for the respective binders can be the same. As a result, the user will not be confused when counting the number of print copies of printing results.

Figure 22:
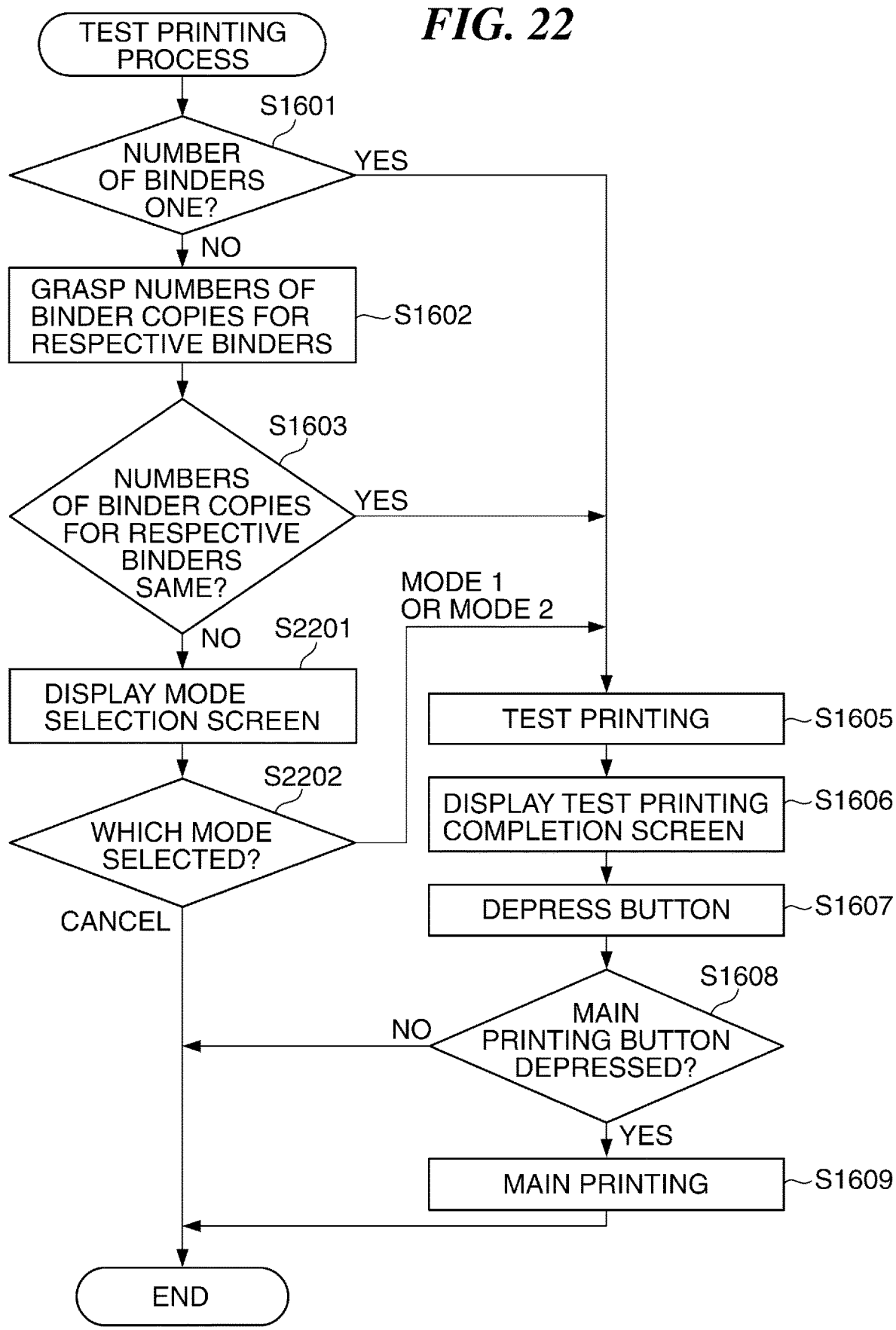
FIG. 22 is a flowchart showing the procedure of a fourth variation of the test printing process in FIG. 16.

FIG. 22 is a flowchart showing a fourth variation of the test printing process in FIG. 16. Processes in steps S1601 to S1603 and S1605 to S1609 are the same as those in the steps S1601 to S1603 and S1605 to S1609 in FIG. 16, and therefore, only features different from the processes in FIG. 16 will be described below.

Figure 23:
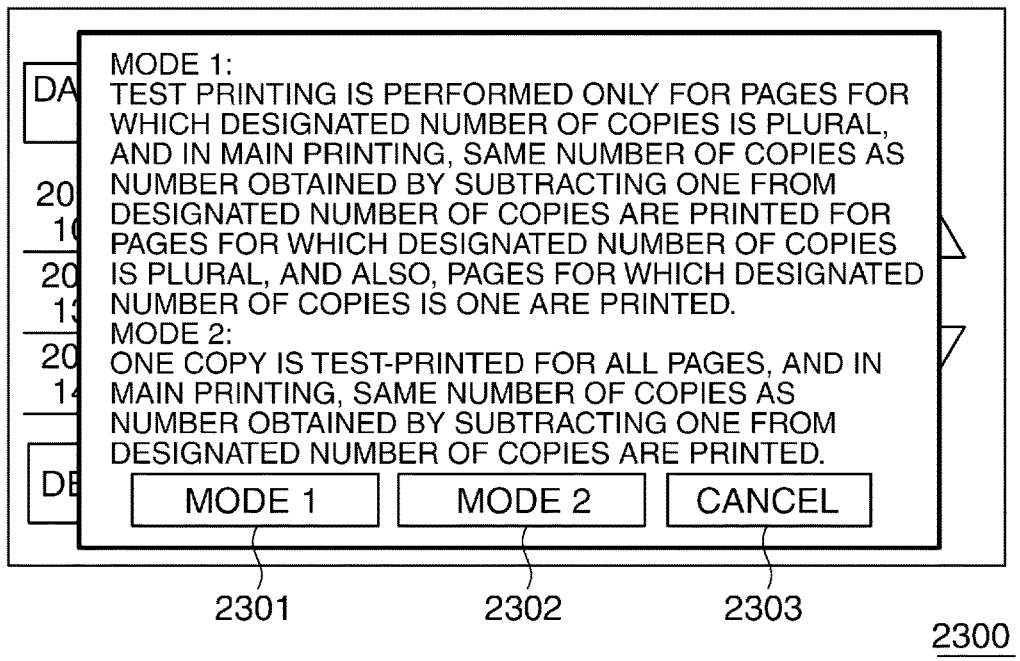
FIG. 23 is a view useful in explaining a mode selection screen which is displayed on the operating unit in step S2201 in FIG. 22.

As a result of the determination in the step S1603, when the numbers of binder copies for respective binders are not the same, the user interface control unit 301 displays, on the operating unit 202, a mode selection screen 2300 (FIG. 23) (step S2201). The mode selection screen 2300 has a mode-1 button 2301, a mode-2 button 2302, and a cancel button 2303. The user interface control unit 301 then determines whether the button depressed by the user is the mode-1 button 2301 or the mode-2 button 2302 (step S2202). When the button depressed by the user is the mode-1 button 2301, test printing is performed for only a binder from which a plurality of printing results will be obtained, and test printing is not performed for a binder of which only one copy will be made (first mode), and when the button depressed by the user is the mode-2 button 2302, test printing is performed for all of a plurality of binders (second mode).

As a result of the determination in the step S2202, when the mode-1 button 2301 or the mode-2 button 2302 is depressed, the user interface control unit 301 notifies the job management unit 305 of the type of the depressed button, followed by the process proceeding to the step S1605. As a result, test printing is performed based on the type of the depressed button. On the other hand, when the cancel button 2303 is depressed, the present process is terminated.

According to the process in FIG. 22, when the number of binder copies for respective binders constituting the print job 1401 are not the same, the first mode or the second mode is selected (step S2202). When the first mode is selected, test printing is not performed for a binder for which the designated number of print copies is one, and this prevents printing results from being obtained for a binder of which printing results do not have to be seen by going so far as performing test printing. This prevents printing results of test printing from unnecessarily increasing, and as a result, the user will not be confused when print data comprised of a plurality of sections is printed by the image forming apparatus having the test printing function.

Figure 24:
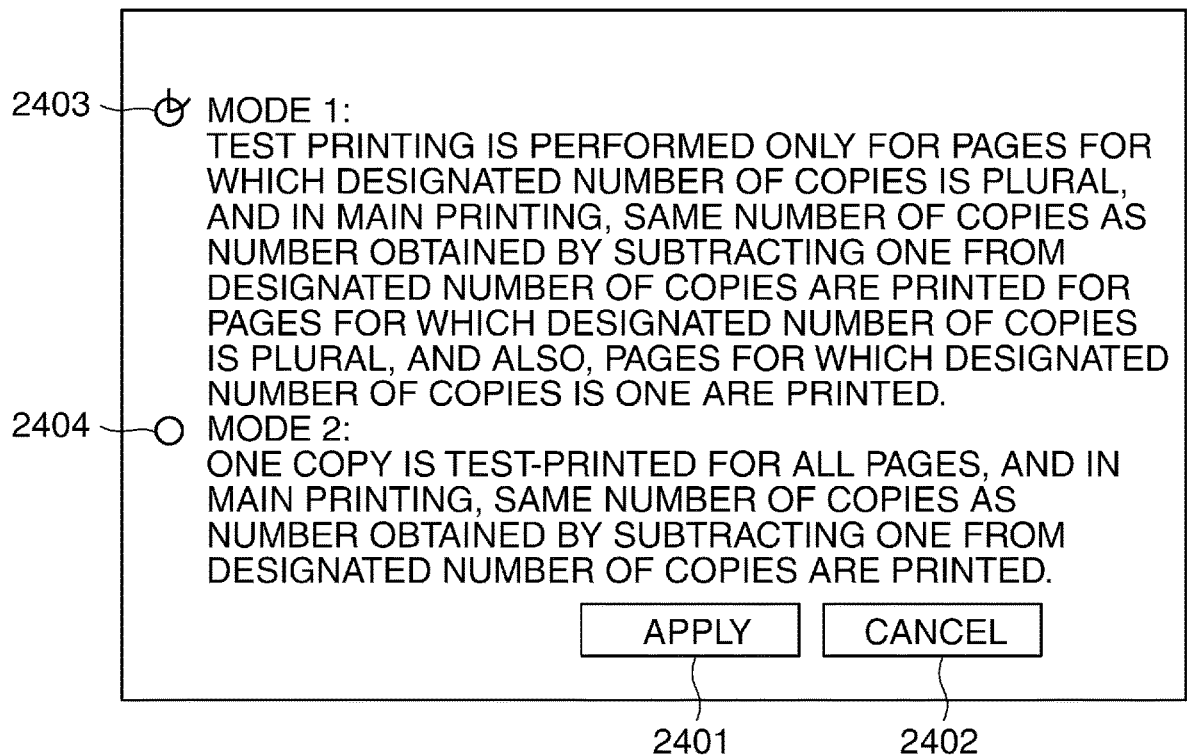
FIG. 24 is a view useful in explaining a test print mode determination screen for use in determining in advance in step S1605 in FIG. 22 a mode in which test printing is performed.

It should be noted that although in the process in FIG. 22, when the numbers of binder copies for respective binders constituting the print job 1401 are not the same, the mode selection screen 2300 (FIG. 23) is displayed on the operating unit 202, and test printing is performed in the first mode or the second mode, a mode in which test printing is performed may be determined in advance. Specifically, before test printing is performed, a test print mode determination screen 2400 (FIG. 24) is displayed on the operating unit 202, and a mode in which test printing is performed is determined by way of the test print mode determination screen 2400. The test print mode determination screen 2400 has an apply button 2401, a cancel button 2402, and checkboxes 2403 and 2404. For example, when the checkbox 2403 is marked, and the apply button 2401 is depressed, test printing is performed in the first mode.

Figure 25:
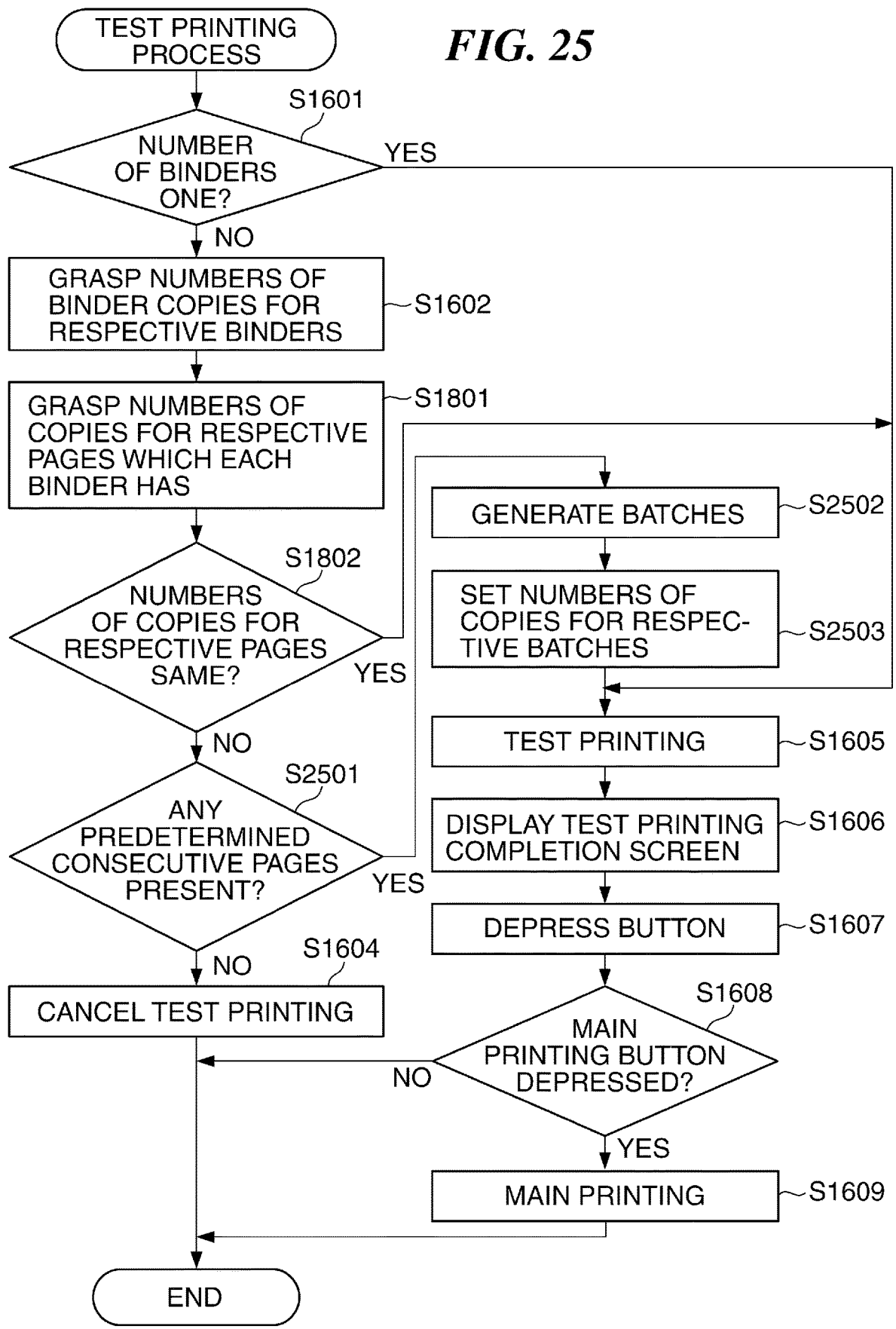
FIG. 25 is a flowchart showing the procedure of a variation of the test printing process in FIG. 18.

FIG. 25 is a flowchart showing a variation of the test printing process in FIG. 18. Processes in steps S1601 to S1602, S1604 to S1609, and S1801 to S1802 in FIG. 25 are the same as those in the steps S1601 to S1602, S1604 to S1609, and S1801 to S1802 in FIG. 18, and therefore, only features different from the processes in FIG. 18 will be described below.

Figure 26:
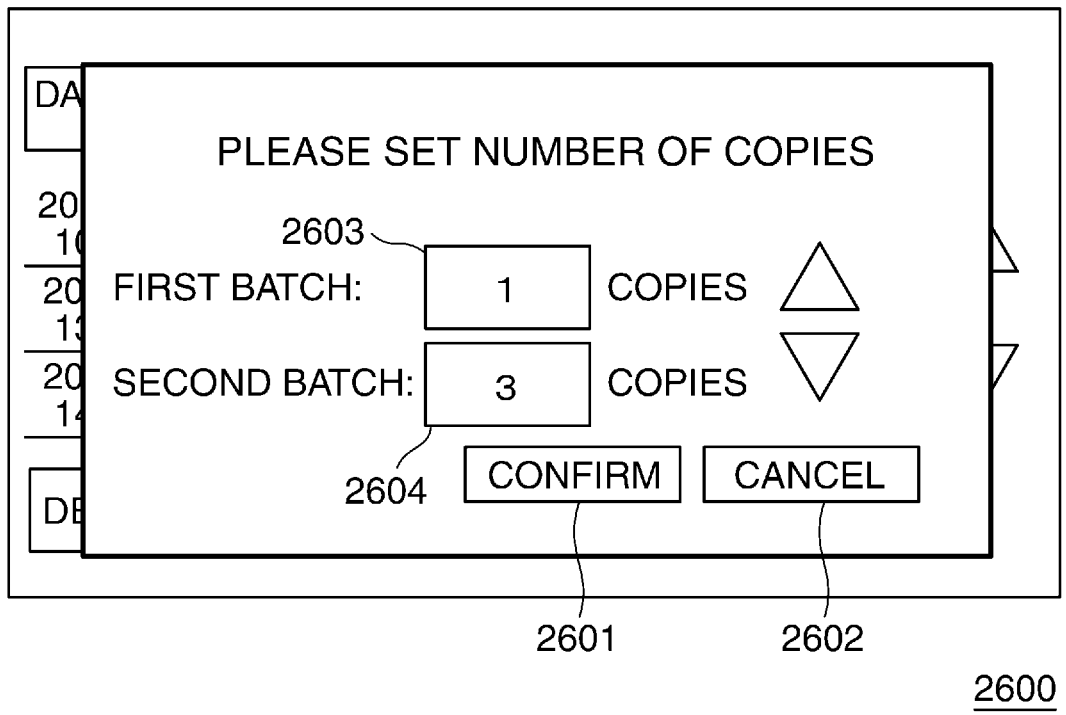
FIG. 26 is a view useful in explaining a number-of-copies setting screen which is displayed on the operating unit in step S2503 in FIG. 25.

As a result of the determination in the step S1802, when the numbers of print copies for respective pages are not the same, the user interface control unit 301 determines whether or not there are any consecutive pages for which the same number of print copies is designated (step S2501). As a result of the determination in the step S2501, when there are any consecutive pages for which the same number of print copies is designated, the user interface control unit 301 generates a batch (batch generation) from these consecutive pages (step S2502), and displays a number-of-copies setting screen 2600 (FIG. 26) on the operating unit 202 to set the number of print copies for each batch (step S2503), followed by the process proceeding to the step S1605. As a result of the determination in the step S2501, when there are no consecutive pages for which the same number of print copies is designated, the process proceeds to the step S1604.

The number-of-copies setting screen 2600 has a confirm button 2601, a cancel button 2602, and a number-of-copies input sections 2603 and 2604, and for example, when two batches are generated in the step S2502, 1 and 3 are entered as the numbers of print copies in the number-of-copies input sections 2603 and 2604, and the confirm button 2601 is depressed to set the numbers of print copies for the respective batches. It should be noted that the steps S1802, S1604 to S1609, and S2501 to S2503 are performed on a binder-by-binder basis.

According to the process in FIG. 25, when there are any consecutive pages for which the same number of print copies is designated, a batch is generated from these consecutive pages (step S2502), and the number of print copies for each batch is set (step S2503). Thus, test printing and main printing are performed on a batch-by-batch basis, and the number of print copies of printing results of test printing and the number of print copies of printing results of main printing are counted on a batch-by-batch basis. This reduces time and effort for the user compared to the case where the number of print copies of printing results of test printing and the number of print copies of printing results of main printing are counted on a page-by-page basis, and as a result, the user will not be confused when print data comprised of a plurality of sections is printed by the image forming apparatus having the test printing function.

Figure 27:
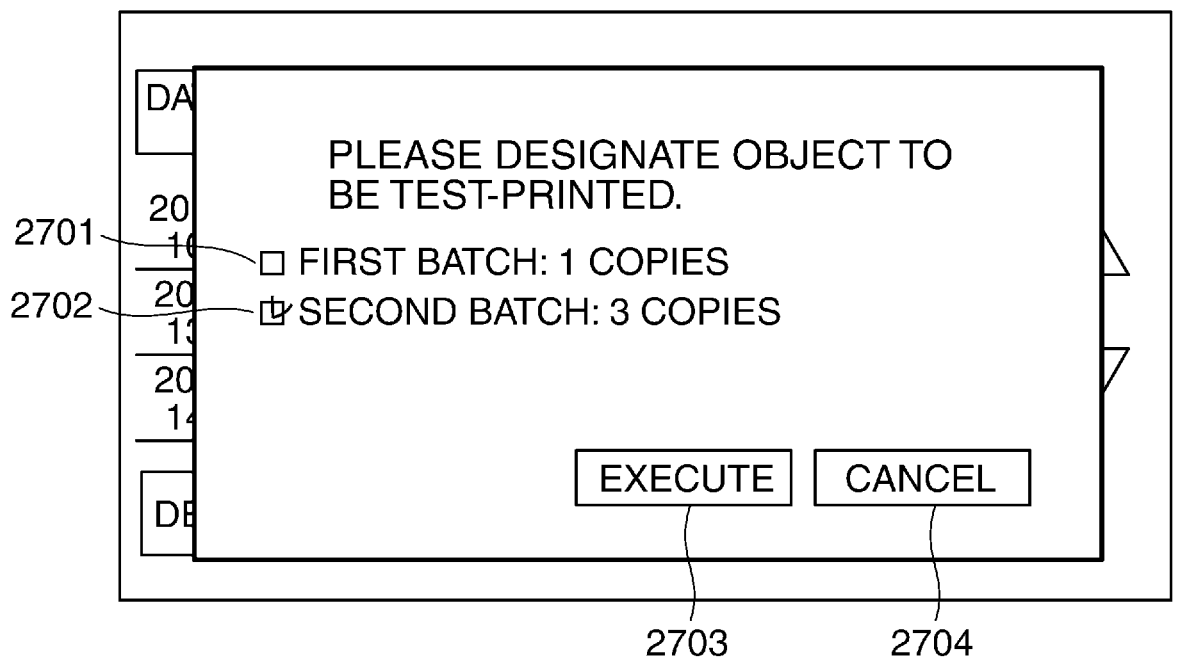
FIG. 27 is a view useful in explaining a test printing advanced setting screen for use in designating an object for which test printing is to be performed before test printing is started after the number of print copies is set for each of batches in the step S2503 in FIG. 25.

FIG. 27 is a view useful in explaining a test printing advanced setting screen 2700 on which a batch to be test-printed is designated before test printing is started after the numbers of print copies for respective batches are set in the step S2503 in FIG. 25.

Referring to FIG. 27, the test printing advanced setting screen 2700 has checkboxes 2701 and 2702 for the first batch and the second batch, respectively, an execution button 2702, and a cancel button 2704. For example, the checkbox 2702 is marked, and the execution button 2703 is depressed when two batches are generated in the step S2503 in FIGS. 25, 1 and 3 are set as the numbers of print copies for the first batch and the second batch, respectively, and the user desires to perform test printing and see printing results only for the second batch.

As a result, the user is allowed to perform test printing and see printing results only for the second batch. Namely, whether or not to perform test printing is determined with respect to each of a plurality of binders constituting print data, and hence the user is allowed to reliably recognize in advance a binder for which test printing will be performed. Thus, the user will not be confused by the presence or absence of printing results of test printing when he or she counts the number of print copies of printing results of test printing and the number of print copies of printing results of main printing with respect to each binder.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-153769, filed Jul. 29, 2014, which is hereby incorporated by reference herein in its entirety.

What is claimed is:

1. A printing apparatus which is capable of performing test printing that prints one copy of a plurality of copies of print data for which the plurality of copies are set, the printing apparatus comprising:
   a user interface;
   one or more memories; and
   one or more processors that execute a set of instructions to:
   receive print data from an information processing apparatus via a network;
   accept, after the receiving of the print data, an instruction to perform the test printing for the received print data via the user interface; and
   print page data corresponding to one copy of a section set for printing a plurality of copies among a plurality of sections included in the received print data, in a case where the instruction to perform the test printing for the received print data is accepted via the user interface.

2. The printing apparatus according to claim 1, wherein the one or more processors further execute the set of instructions to:
   avoid performing test printing for page data corresponding to a section set for printing one copy among the plurality of sections included in the received print data, in a case where the instruction to perform the test printing for the received print data is accepted via the user interface.

3. The printing apparatus according to claim 1, wherein the one or more processors further execute the set of instructions to:
   after printing a copy of one or more pages corresponding to the section set for printing a plurality of copies among the plurality of sections included in the received print data, print page data corresponding to copies, which is reduced by one in number from copies to be printed, of the section set for printing a plurality of copies among the plurality of sections included in the received print data and print page data corresponding to a section set for printing one copy among the plurality of sections included in the received print data, according to an instruction given by a user to print the received print data, being different from the instruction to perform the test printing.

4. A control method for a printing apparatus configured to be capable of performing test printing that prints one copy of a plurality of copies of print data for which the plurality of copies are set, the control method comprising:
   receiving print data from an information processing apparatus via a network;
   accepting, after the receiving of the print data, an instruction to perform the test printing for the received print data via a user interface of the printing apparatus; and
   printing page data corresponding to one copy of a section set for printing a plurality of copies among a plurality of sections included in the received print data, in a case where the instruction to perform the test printing for the received print data is accepted via the user interface.

5. A non-transitory computer readable storage medium on which is stored a computer program for making a computer execute a control method for printing apparatus configured to be capable of performing test printing that prints one copy of a plurality of copies of print data for which the plurality of copies are set, the control method comprising:

receiving print data from an information processing apparatus via a network;

accepting, after the receiving of the print data, an instruction to perform the test printing for the received print data via a user interface of the printing apparatus; and printing page data corresponding to one copy of a section set for printing a plurality of copies among a plurality of sections included in the received print data, in a case where the instruction to perform the test printing for the received print data is accepted via the user interface.

* * * * *